United States Patent [19]
Oare et al.

[11] Patent Number: 5,871,600
[45] Date of Patent: Feb. 16, 1999

[54] RUNFLAT TIRE WITH DIFFERENT MODULUS OR ELONGATION CARCASS CORDS

[75] Inventors: Thomas Reed Oare, Suffield; Amit Prakash, Hudson; Robert Edward Hall, Silver Lake; Gary Edwin Tubb, Copley, all of Ohio

[73] Assignee: The Goodyear Tire & Rubber Company, Akron, Ohio

[21] Appl. No.: 865,489

[22] Filed: May 29, 1997

[51] Int. Cl.$^6$ .................. B60C 9/00; B60C 9/08; B60C 15/00; B60C 17/00

[52] U.S. Cl. .................. 152/458; 152/517; 152/540; 152/541; 152/542; 152/543; 152/546; 152/550; 152/551; 152/554; 152/555; 152/556; 152/557

[58] Field of Search .................. 152/557, 517, 152/555, 554, 550, 551, 553, 458, 540–543, 546, 520, 556

[56] References Cited

U.S. PATENT DOCUMENTS

| | | |
|---|---|---|
| 3,062,258 | 11/1962 | Maiocchi . |
| 3,160,192 | 12/1964 | Drew .................. 152/557 X |
| 3,509,930 | 5/1970 | Mirtain .................. 152/557 X |
| 3,540,511 | 11/1970 | Mirtain .................. 152/557 X |
| 4,067,372 | 1/1978 | Masson . |
| 4,202,393 | 5/1980 | Ikeda et al. . |
| 4,378,041 | 3/1983 | Tsurunaga et al. .................. 152/557 X |
| 4,732,199 | 3/1988 | Kajiwara .................. 152/557 |
| 4,770,222 | 9/1988 | Mezzanotte .................. 152/557 X |
| 4,842,033 | 6/1989 | Nguyen . |
| 5,060,707 | 10/1991 | Sumikawa . |
| 5,234,043 | 8/1993 | Suzuki et al. . |
| 5,238,040 | 8/1993 | Ghilardi . |
| 5,368,082 | 11/1994 | Oare et al. . |
| 5,392,830 | 2/1995 | Janello et al. . |
| 5,427,166 | 6/1995 | Willard, Jr. . |
| 5,511,599 | 4/1996 | Willard, Jr. . |
| 5,639,320 | 6/1997 | Oare et al. . |

FOREIGN PATENT DOCUMENTS

| | | |
|---|---|---|
| 1126635 | 6/1982 | Canada . |
| 475258A1 | 3/1992 | European Pat. Off. . |
| 0535938 | 4/1993 | European Pat. Off. . |
| 502689A | 11/1967 | France . |
| 0174004 | 10/1983 | Japan . |

*Primary Examiner*—Adrienne Johnstone
*Attorney, Agent, or Firm*—David L. King

[57] ABSTRACT

A runflat radial ply pneumatic tire 10 has a carcass 30 which has a pair of sidewalls 20, each sidewall being reinforced with at least two sidewall fillers or runflat inserts 42, 46 and at least two cord reinforced plies 38, 40 and a bead core 26. The tire has one or more reinforcing belts 36. Each sidewall has at least one ply 38 or 40 reinforced with cords, the cords have a modulus E of X, X being at least 10 GPa. At least one ply has a turnup end 32 wrapped around the bead core 26. A second ply 38 or 40 is reinforced with substantially inextensible cords having a modulus E greater than X of the cords of the other ply. The second ply 38 or 40 is spaced from the first ply 38 or 40 by the second filler or runflat insert in the sidewall 20.

23 Claims, 14 Drawing Sheets

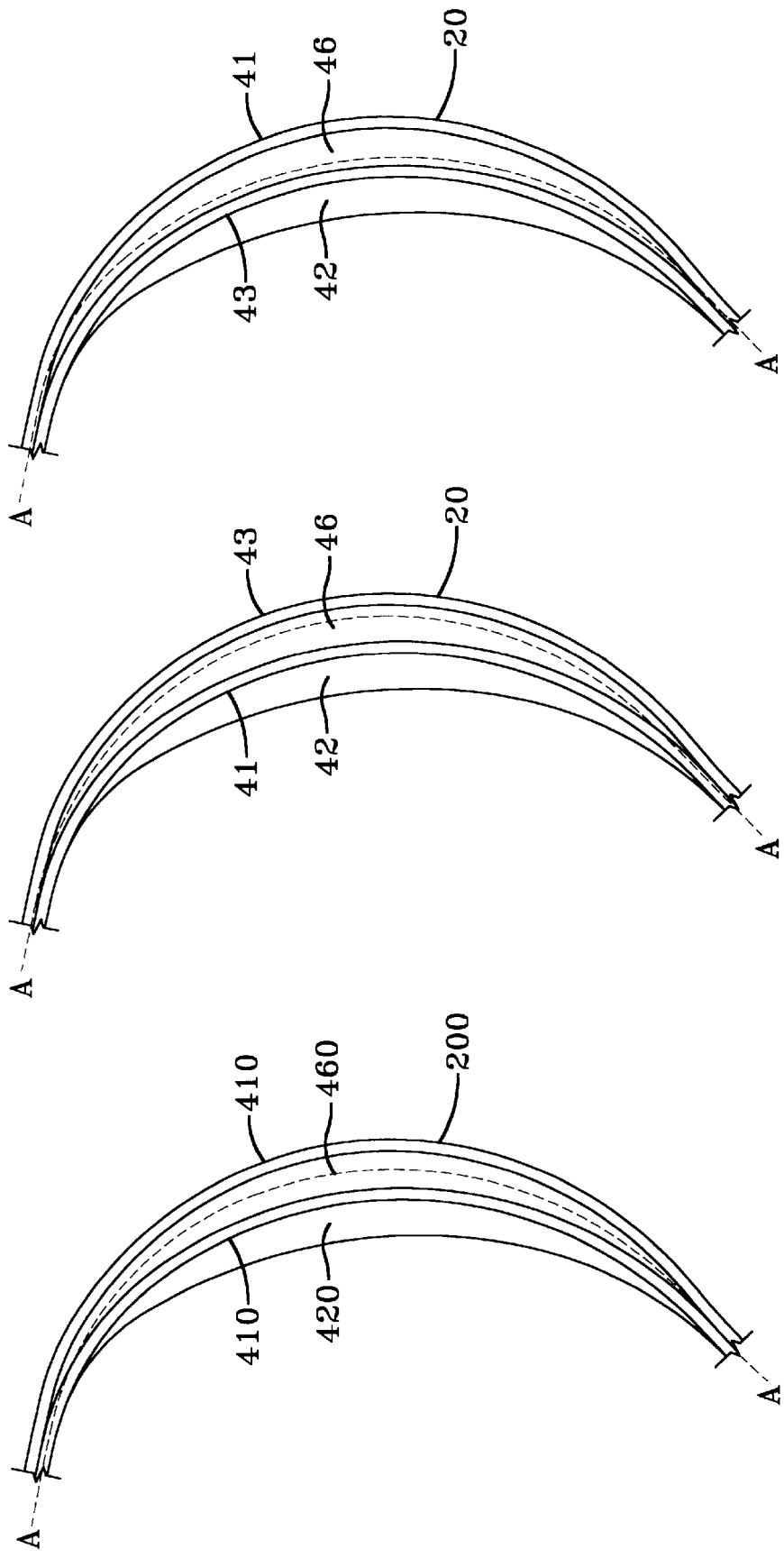

RUNFLAT TIRE WITH DIFFERENT MODULUS OR ELONGATION CARCASS CORDS

TECHNICAL FIELD

This invention relates to a tire; more particularly to a pneumatic tire capable of being used in the uninflated condition. The tire carcass structure can be comparable to the ride performance of conventional tires and can be made without exhibiting the normal weight penalties associated with runflat type tires.

BACKGROUND OF THE INVENTION

Various tire constructions have been suggested for pneumatic runflat tires, that is, tires capable of being driven on in the uninflated condition. One approach described in U.S. Pat. No. 4,111,249 entitled the "Banded Tire" was to provide a hoop or annular band directly under and approximately as wide as the tread. The hoop in combination with the rest of the tire structure could support the vehicle weight in the uninflated condition. This banded tire actually tensioned the ply cords even in the uninflated condition.

Another approach taken has been to simply strengthen the sidewalls by increasing the cross-sectional thickness thereof. These tires when operated in the uninflated condition place the sidewall in compression. Due to the large amounts of rubber required to stiffen the sidewall members, heat build-up is a major factor in tire failure. This is especially true when the tire is operated for prolonged periods at high speeds in the uninflated condition. Pirelli discloses such a tire in European Pat. Pub. No. 0-475-258A1.

A Goodyear patent having some of the same inventors of the present invention disclosed the first commercially accepted runflat pneumatic radial ply tire, the Eagle GSC-EMT tire. The tire was accepted as an equipment option for the 1994 Corvette automobile. U.S. Pat. No. 5,368,082 teaches the employment of special sidewall inserts to improve stiffness. Approximately six additional pounds of weight per tire was required to support an 800 lb load in this uninflated tire. These runflat tires had a very low aspect ratio. This earlier invention although superior to prior attempts still imposed a weight penalty per tire that could be offset by the elimination of a spare tire and the tire jack. This weight penalty was even more problematic when the engineers attempted to build higher aspect ratio tires for the large luxury touring sedans. The required supported weight for an uninflated luxury car tire approximates 1400 lbs. load. These taller sidewalled tires having aspect ratios in the 55% to 65% range or greater means that the working loads were several times that of the earlier 40% aspect ratio runflat Corvette type tires. Such loads meant that the sidewalls and overall tire had to be stiffened to the point of compromising ride. Luxury vehicle owners simply will not sacrifice ride quality for runflat capability. The engineering requirements have been to provide a runflat tire with no loss in ride or performance. In the very stiff suspension performance type vehicle the ability to provide such a tire was comparatively easy when compared to luxury sedans with a softer ride characteristic. Light truck and sport utility vehicles, although not as sensitive to ride performance, provide a runflat tire market that ranges from accepting a stiffer ride to demanding the softer luxury type ride.

An equally important design consideration in the development of a runflat tire is insuring that the uninflated tire remains seated on the rim. Solutions have been developed employing bead restraining devices as well as special rims to accomplish this requirement such as Bridgestone Expedia S-01 Runflat A/M Tire. Alternatively, the Eagle GSC-EMT tire employed a new bead configuration enabling the tire to function on standard rims without requiring additional bead restraining devices.

Two U.S. Pat. Nos. 5,427,166 and 5,511,599 of Walter L Willard, Jr., show Michelin tires that disclose the addition of a third ply and an addition of a third insert in the sidewall to further increase the runflat performance of the tire over the original U.S. Pat. No. 5,368,082 Oare et al. patents. These patents discuss some of the load relations that occur in the uninflated condition of the tire and they demonstrate that the Oare et al. concept can be applied to addition numbers of plies and inserts.

A latter runflat tire attempt is taught in U.S. Pat. No. 5,685,927 which provides a higher aspect ratio tire with the employment of a load supporting bead core placed directly under the tread belt package of the tire. Again, most of the inventors of that concept were part of the original design team of the original Corvette EM tire. Although very promising in load support and ride that approach showed somewhat higher rolling resistance in the normally inflated conditions.

A further latter U.S. Pat. No. 5,535,800 discloses the use of elastomeric covered composite ribs that in combination with a radial ply can provide excellent runflat capability in a wide range of tire applications.

An object of the present invention was to provide a tire having limited runflat mileage without appreciably increasing the tire's weight, rolling resistance or diminishing the overall ride performance.

A second objective was to apply the inventive concept to a variety of alternative carcass constructions.

SUMMARY OF THE INVENTION

A tire 10 has a tread 12, a belt structure 36 and a carcass 30. The carcass 30 has a pair of sidewalls 20, each sidewall 20 has at least one ply 38 or 40 reinforced with cords 41 having a modulus E of X, X being preferably at least 10 GPa. At least one ply 38 has a pair of turnup ends wrapped around a pair of inextensible bead cores. Each sidewall structure 20 has at least one insert 42 radially inward of the first ply 38, a second ply 40 extending at least to each bead core 26, the second ply being spaced from the first ply 38 by a second insert 46 in the sidewall 20. At least one ply 38 or 40 is reinforced with substantially inextensible cords having a modulus greater than the modulus X of the other ply.

The tire 10, when loaded, has a neutral axis of bending A of the sidewall structure 20 closer in proximity to the ply reinforced with cords of a higher modulus than to the ply reinforced with cords of the lower modulus X.

In the preferred embodiment the first ply 38 has synthetic or textile cords of polyester, nylon, rayon or aramid; while the second ply 40 most preferably had aramid or metal cords, most preferably steel cords.

The first and second inserts 42,46 preferably were elastomeric having a cross-sectional shape and material properties selected to enhance inflated ride performance while insuring runflat durability. For example, the Shore A hardness of the elastomeric first and second runflat inserts may be in the range of 40 to 90. The inserts 42,46 could also be reinforced with cords 41,43 or short fibers.

The inventive concept can be applied to tires 10 having three or more plies and three or more inserts.

The term ply is contemplated to include cord reinforced inserts which do not extend from one bead core 26 to the opposite bead core. It is contemplated that at least one ply 38 or 40 must extend from bead core 26 to the opposite bead core 26, preferably a radial ply. The second ply can extend from a bead core 26 to just laterally under one or more of the reinforcing belts 50,51 of the belt structure 36.

In the preferred embodiment, the ply 40 having cords 43 of a higher modulus is radially outward of the first ply 38. In an alternative embodiment the ply 40 is reinforced with cords 41 of a lower modulus X while the ply 38 is reinforced with the higher modulus cords 43 and is radially inward of the other first ply 40.

Both plies 38,40 need not be continuous, for example, they may extend from bead core 26 to just inside the belt edges 36.

BRIEF DESCRIPTION OF THE DRAWINGS

FIGS. 3A, 3B and 3C are cross-sectional schematic views of the prior art sidewall construction of FIG. 1, and the sidewall construction of the inventive sidewall constructions of a first and second embodiments. Each view shows in dashed lines the neutral bending axis A—A.

DEFINITIONS

Figure 1:
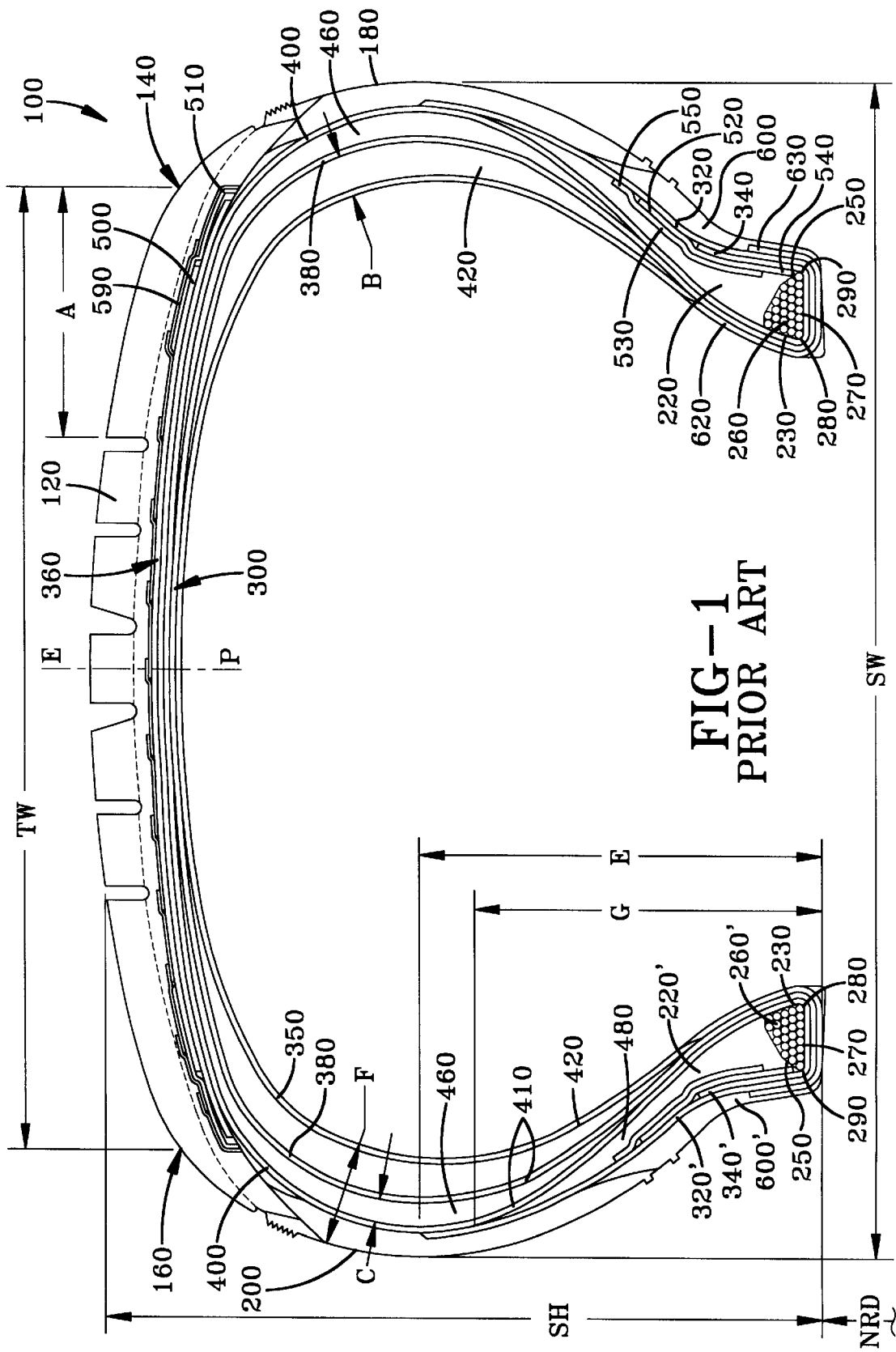
FIG. 1 is a cross-sectional view of a prior art runflat tire made in accordance with one embodiment of the invention taught in U.S. Pat. No. 5,368,082.

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including the beads.

"Casing" means the carcass, belt structure, beads, sidewalls and all other components of the tire excepting the tread and undertread.

"Chafers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

DETAILED DESCRIPTION OF THE PREFERRED EMBODIMENT

Referring to FIGS. 1 and 3A there is illustrated a portion of the cross section of a prior art tire 100 made in accordance with U.S. Pat. No. 5,368,082. The tire 100 is a passenger tire having a tread 120, a belt structure 360, a pair of sidewall portions 180,200, a pair of bead portions 220,220' and a carcass reinforcing structure 300. The carcass 300 includes a first ply 380 and second ply 400, a liner 350, a pair of beads 260,260' and a pair of bead fillers 480,480', a pair first insert fillers 420,420' and a pair of second insert fillers 460,460', the first insert filler 420,420' being located between the liner 350 and the first ply 380, the second insert fillers 460,460' being located between the first and second ply 380,400. This carcass structure 300 gave the tire 100 a limited runflat capability.

The term runflat as used in this patent means that the tire structure alone is sufficiently strong to support the vehicle load when the tire is operated in the uninflated condition, the sidewall and internal surfaces of the tire not collapsing or buckling onto themselves, without requiring any internal devices to prevent the tire from collapsing.

The conventional pneumatic tire when operated without inflation collapses upon itself when supporting a vehicle load.

As can be seen from FIG. 3A the structural reinforcement in the sidewall area of the tire 100 substantially increased the thickness of the overall sidewall particularly from the maximum section width radially outward to the shoulder. This prior art patent taught that the overall sidewall thickness where it merges with the shoulder should be at least 100% preferably 125% of the overall sidewall thickness as measured at the maximum section width. This was believed to be necessary to sufficiently support the load in an uninflated state. The inserts for a typical P275/40ZR17 tire weighed approximately 6.0 lbs. The first insert 420,420' had a maximum gauge thickness of 0.30 inches (7.6 mm) the second insert 460,460' had a maximum gauge thickness of 0.17 inches (4.3 mm). Employing this original prior art concept in a P235/55R17 tire of a higher aspect ratio meant that the total insert weight increased to about 6.8 pounds and the gauge thickness of the first insert was 0.3 inches while the second insert had a maximum gauge of 0.2 inches.

The reference numerals as depicted in the drawings are the same as those referred to in the specification. For purposes of this application the various embodiments illustrated in FIGS. 2, 3B, 3C through 11B each use the same reference numerals for similar components. The structures employ basically the same components with variations in location or quantity thereby giving rise to the alternative constructions in which the inventive concept can be practiced.

Figure 2A:
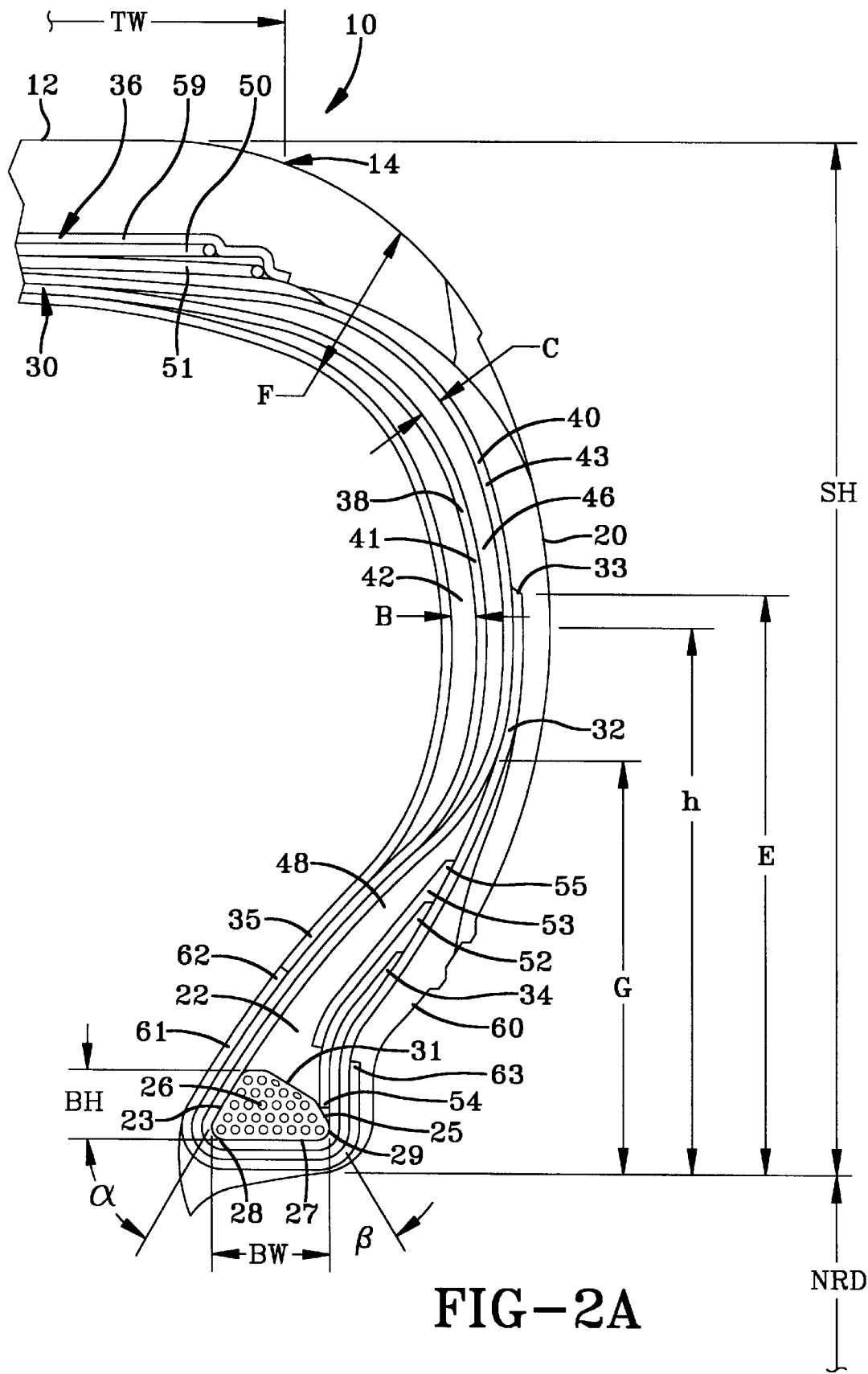
FIG. 2A is an enlarged fragmentary cross-sectional view of a tread shoulder, a sidewall, and a bead region of the preferred embodiment tire of the invention.
Figure 2B:
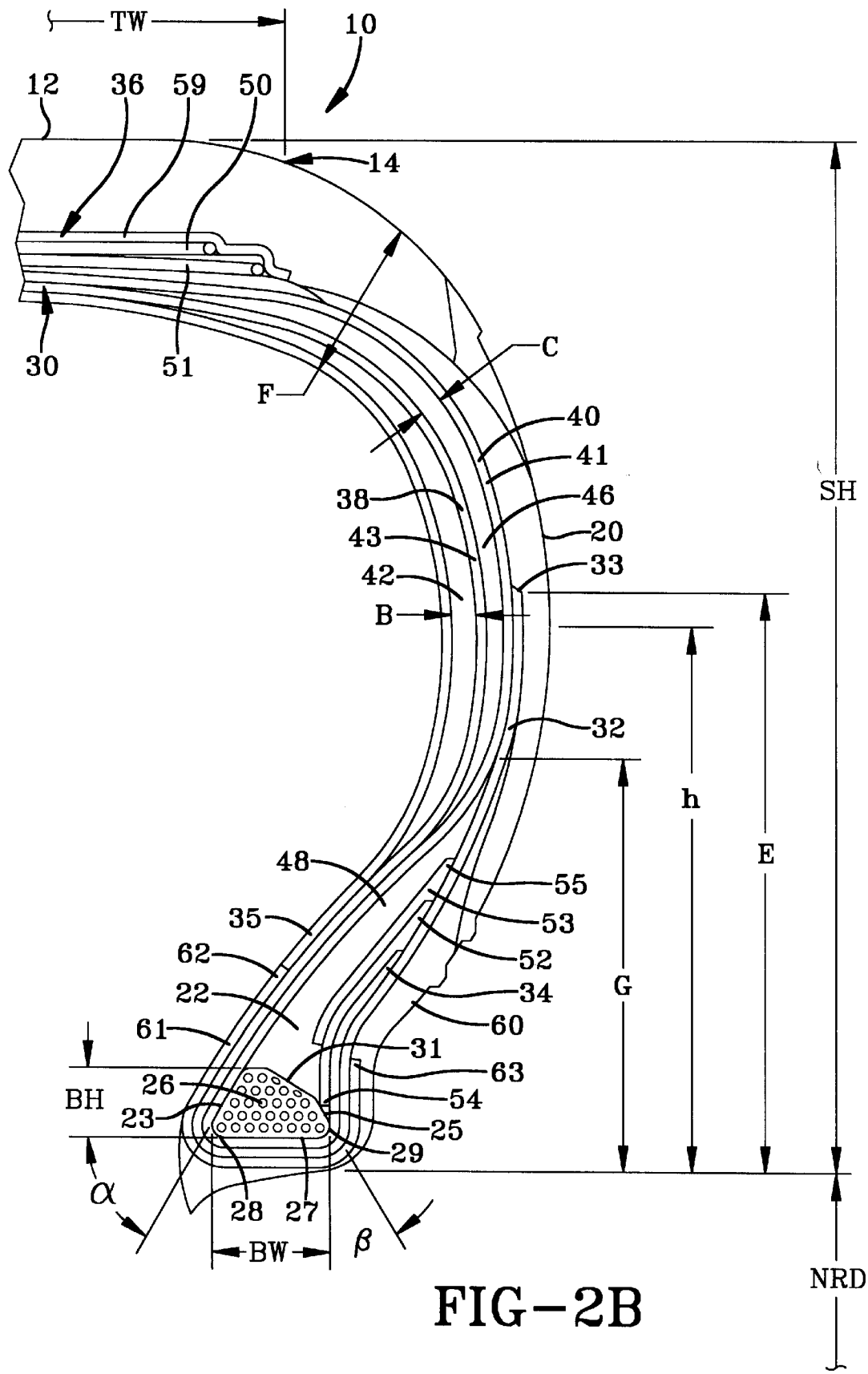
FIG. 2B is an enlarged fragmentary cross-sectional view of a tread shoulder, a sidewall, and a bead region of an alternative embodiment tire of the present invention wherein the cords 43 of a higher modulus is placed in the radially inner ply 38.

The tire 10 according to the present invention employs a unique sidewall structure 20. Tires 10 as illustrated in FIGS. 2A and 2B. are radial passenger or light truck tires; the tires 10 are provided with a ground-engaging tread portion 12 which terminates in the shoulder portions at the lateral edges 14,16 of the tread 12 respectively. A pair of sidewall portions 20 extends from tread lateral edges 14,16 respectively and terminates in a pair of bead regions 22 each having an annular inextensible bead core 26 respectively. The tire 10 is further provided with a carcass reinforcing structure 30 which extends from bead region 22 through one sidewall portion 20, tread portion 12, the opposite sidewall portion 20 to bead region 22. The turnup ends of at least one ply 38,40 carcass reinforcing structure 30 are wrapped about bead cores 26 respectively. The tire 10 may include a conventional innerliner 35 forming the inner peripheral surface of the tire 10 if the tire is to be of the tubeless type. Placed circumferentially about the radially outer surface of carcass reinforcing structure 30 beneath tread portion 12 is a tread reinforcing belt structure 36. In the particular embodiment illustrated, belt structure 36 comprises two cut belt plies 50,51 and the cords of belt plies 50,51 are oriented at an angle of about 23 degrees with respect to the mid-circumferential centerplane of the tire.

The cords of belt ply 50 are disposed in an opposite direction relative to the mid-circumferential centerplane and from that of the cords of belt ply 51. However, the belt structure 36 may comprise any number of belt plies of any desired configuration and the cords may be disposed at any desired angle. The belt structure 36 provides lateral stiffness across the belt width so as to minimize lifting of the tread from the road surface during operation of the tire in the uninflated state. In the embodiments illustrated, this is accomplished by making the cords of belt plies 50, 51 of preferably steel and more preferably of a steel cable construction.

The carcass reinforcing structure 30 of the preferred embodiment tire 10 as shown in FIG. 2A comprises at least two reinforcing ply structures 38,40. In the particular embodiment illustrated, there is provided a radially inner first reinforcing ply structure 38 and a radially outer second reinforcing ply structure 40, each ply structure 38,40 has preferably one layer of parallel cords each layer having cords 41 or 43 respectively. The cords 41,43 of reinforcing ply structure 38,40 are oriented at an angle of at least 75 degrees with respect to the mid-circumferential centerplane CP of the tire 10. In the particular embodiment illustrated, the cords 41,43 are oriented at an angle of about 90 degrees with respect to the mid-circumferential centerplane CP. The cords 41,43 may be made of any material normally used for cord reinforcement of rubber articles, for example, and not by way of limitation, aramid, rayon, nylon and polyester, steel.

For the carcass cords 41,43 organic fiber cords with an elastic modulus in the range of 2.5–15 GPa such as nylon 6, nylon 6—6, rayon, polyester or high-modulus cords, commonly are used. In the case that 840-to-1890 denier fiber cords are used such cords are preferably embedded in a rubber having a 100% modulus of 10 to 50 kgf/sq cm at a density of 35 to 60 cords/5 cm.

Other high modulus fiber include aramid, vinylon, pen pit, carbon fiber, glass fiber, polyamides. For the purposes of this invention the cords in at least two ply structures 38,40 or one ply and a cord reinforced insert 80 must have cord modulus that is different. For example, if one cord 41 has a modulus 10 Gpa another carcass ply or carcass insert must have cords 43 having a modulus greater than 10 GPa.

Preferably, the cords are made of material or are coated with a material having a high adhesion property with rubber and high heat resistance. In the particular embodiment illustrated, the cords 41 are made from rayon. The cords 41 have a nominal modulus E of X and a percent elongation of Y. The preferred rayon cord 41 has X values in the range of 6–15 GPa and percent elongations Y in the range of 10 to 20%.

The second ply 40 has cords 43 that are preferably substantially inextensible, the cords 43 are synthetic or metal, more preferably metal, most preferably steel of high tensile strength. The cords 43 have modulus greater than X, preferably many times X. In the case of steel cords 43, the modulus is greater than 150 GPa. One way of achieving such strength is by merging the proper process and alloys as disclosed in U.S. Pat. No. 4,960,473 and 5,066,455, which are hereby incorporated by reference in its entirety herein, with a steel rod microalloyed with one or more of the following elements: Ni, Fe, Cr, Nb, Si, Mo, Mn, Cu, Co, V and B. The preferred chemistry is listed below in weight percentages:

| | |
|---|---|
| C | 0.7 to 1.0 |
| Mn | 0.30 to 0.05 |
| Si | 0.10 to 0.3 |
| Cr | 0 to 0.4 |
| V | 0 to 0.1 |
| Cu | 0 to 0.5 |
| Ni | 0 to 0.5 |
| Co | 0 to 0.1 |
| the balance being iron and residuals | |

The resulting rod is then drawn to the appropriate tensile strength.

The cords 43 for use in the carcass 30 may comprise from one (monofilament) to multiple filaments. The number of total filaments in the cord 43 may range from 1 to 13. Preferably, the number of filaments in per cord 1 ranges from 6 to 7. The individual diameter (D) of each filament 9 generally ranges from 0.10 to 0.30 mm, for each filament having at least a tensile strength of 2000 MPa to 5000 MPa, preferably at least 3000 MPa.

Another critical property of the steel cord 43 is that the total elongation for each filament in the cord must be at least 2 percent over a gauge length of 25 centimeters. Total elongation is measured according to ASTM A370-92. Preferably, the total elongation of the cord ranges from about 2 percent to 4 percent. A particularly preferred total elongation ranges from about 2.2 to about 3.0 percent.

The torsion values for the steel for the filament used in the cord should be at least 20 turns with a gauge length of 200 times the diameter of the wire. Generally, the torsion value ranges from about 20 to about 100 turns. Preferably, the torsion values range from about 30 to about 80 turns with a range of from about 35 to 65 being particularly preferred. The torsion values are determined according to ASTM Test Method E 558-83 with test lengths of 200 times the diameter of the wire.

There are a number of specific metallic cord 43 constructions for use in the carcass ply 38 or 40. Representative examples of specific cord constructions include 1×, 2×, 3×, 4×, 5×, 6×, 7×, 8×, 11×, 12×, 1+2, 1+4, 1+5, 1+6, 1+7, 1+8, 2+1, 3+1, 5+1, 6+1, 11+1, 12+1, 2+7, 2+7+1, 3+9, 1+5+1 and 1+6+1 or 3+9+1, the outer wrap filament may have a tensile strength of 2500 MPa or greater based on a filament diameter of 0.15 mm. The most preferred cord constructions including filament diameters are 3×0.18, 1+5×0.18, 1+6× 0.18, 2+7×0.18, 2+7×0.18×1×0.15, 3+9×0.18+1×0.15, 3+9× 0.18, 3×0.20+9×0.18 and 3×0.20+9 ×0.18+1×0.15. The above cord designations are understandable to those skilled in the art. For example, designation such as 2×, 3×, 4×, and 5×mean a bunch of filaments; ie, two filaments, three filaments, four filaments and the like. Designation such as 1+2 and 1+4 indicate, for example, a single filament wrapped by two or four filaments.

The carcass ply 38 or 40 has a layer of the above-described steel cords arranged so as to have from about 5 to about 100 ends per inch (≈2 to 39 ends per cm) when measured at the equatorial plane of the tire. Preferably, the layer of cords are arranged so as to have about 7 to about 60 ends per inch (≈2.7 to 24 ends per cm) at the equatorial plane. The above calculations for ends per inch are based upon the range of diameters for the cord, strength of the cord and the practical strength requirement for the carcass ply 38,40. For example, the high number of ends per inch would include the use of a lower diameter cord for a given strength versus a lower number of ends per inch for a higher diameter wire for the same strength. In the alternative, if one elects to use a cord of a given diameter, one may have to use more or less ends per inch depending on the strength of the cord.

The metallic cords 43 of the carcass ply 38 or 40 are oriented such that the tire 10 according to the present invention is what is commonly referred to as a radial.

The steel cord of the carcass ply intersect the equatorial plane (EP) of the tire at an angle in the range of from 75° to 105°. Preferably, the steel cords intersect at an angle of from 82° to 98°. The preferred range is from 89° to 91°.

The ply 38 or 40 has a plurality of fine diameter cords 43 with the cord diameter C less than 1.2 mm. The cord 43 can be any of the before mentioned cords including but not limited to 1+5×0.18 mm or 3×0.18 mm or a monofilament wire having a diameter of about 0.25 mm, preferably 0.175 mm. It is considered desirable that these cords 43 have filaments having a minimum tensile strength of at least 2500 MPa and over 2.0 percent elongation, preferably about 4000 MPa and over 2.5 percent elongation.

Alternatively, as shown in FIG. 2B the sidewall structure having plies 38 could have its cords be the cords 43 of a higher modulus greater than X and the ply 40's have the cords 41 of the lower modulus X. In such an application the sidewall will have a structure as shown in FIG. 3C. The benefits of each structure will be discussed in detail later. The first and second reinforcing ply structure 38,40 each preferably comprise a single ply layer, however, any number of carcass plies may be used.

As further illustrated in FIG. 2A, the first ply structure 38 has a pair of turnup ends 32 respectively which wrap about each bead core 26. The ends 34 of the second ply 40 are in proximity to the bead core 26 and terminate radially adjacent on either side of the bead core 26, above the bead core 26 or can be wrapped around the bead core 26 and terminates radially below the turnup end 32 of the first ply 38 as shown. The turnup ends 32 of the first ply 38 wrap about the second ply ends 34 and the bead core 26. The turnup ends 32 of the first ply 38 terminates radially a distance E above the nominal rim diameter of the tire in proximity to the radial location of the maximum section width of the tire 10. In one embodiment, the at least one first ply has a pair of turnup ends, one end being wrapped about each bead core and extending radially to a distance of at least 40% of SH. In another embodiment, the tire 10 has the turnup ends of the at least one ply extending radially to and laterally under the belt structure. In the preferredembodiment, the turnup ends 32 are located within 20% of the section height of the tire from the radial location of the maximum section width, most preferably terminating at the radial location of the maximum section width.

As further illustrated in FIGS. 2A and 2B, the bead regions 22 of the tire 10 each have an annular substantially inextensible first and second bead cores 26 respectively. The bead cores 26 each have a flat base surface 27 defined by an imaginary surface tangent to the radially innermost surfaces of the bead wires. The flat base surface 27 has a pair of edges 28,29 and a width "BW" between the edges. The bead core 26 has an axially inner first surface 23 extending radially from edge 28 and an axially outer second surface 25 extending radially from edge 29. The first surface 23 and the flat base surface 27 form an acute included angle α. The second surface 25 and the flat base surface 27 form an acute included angle β. The angle α is greater than or equal to the angle β. In the preferred embodiment, α approximately equals β.

The bead core 26 may further include a radially outer surface 31 extending between the first and second surfaces 23,25 respectively. The radial outer surface 31 has a maximum height "BH." The height BH is less than the width of the base BW. The cross-section defined by surfaces 23,25, 27, and 31 preferably are in the form of an isosceles triangle. The upper portion of the triangular shape cross-section is generally not required because the strength of the core 26 as illustrated is sufficient to restrain the beads of an uninflated tire on the rim.

The bead core is preferably constructed of a single or monofilament steel wire continuously wrapped. In the preferred embodiment 0.050 inch diameter wire is wrapped in layers radially inner to radially outer of 8,7,6,4,2 wires, respectively.

The flat base surfaces of the first and second bead cores 26 are preferably inclined relative to the axis of rotation, and the bottom of the molded portion of the bead is similarly inclined, the preferred inclination being approximately about 10° relative to the axis of rotation more preferably about 10.5°. The inclination of the bead region assists sealing the tire and is about twice the inclination of the bead seat flange of a conventional rim and is believed to facilitate assembly and to assist retaining the beads seated to the rim.

Located within the bead region 22 and the radially inner portions of the sidewall portions 20 are high modulus elastomeric apex fillers 48 disposed between carcass reinforcing structure 30 and the turnup ends 32, respectively. The elastomeric fillers 48 extend from the radially outer portion of bead cores 26 respectively, up into the sidewall portion gradually decreasing in cross-sectional width. The elastomeric inserts 48 terminate at a radially outer end at a distance G from the nominal rim diameter NRD of at least 25 percent (25%) of the section height SH of the tire. In the particular embodiment illustrated, the elastomeric fillers 48 each extend radially outward from the nominal rim diameter NRD a distance of approximately forty percent (40%) of the maximum section height SH. For the purposes of this invention, the maximum section height SH of the tire shall be considered the radial distance measured from the nominal rim diameter NRD of the tire to the radially outermost part of the tread portion of the tire. Also, for the purposes of this invention, the nominal rim diameter shall be the diameter of the tire as designated by its size.

In a preferred embodiment of the invention the bead regions 22 further includes at least one cord reinforced member 52,53 located between the bead filler 48 and the ply turnup end 32. The cord reinforced member or members 52,53 have a first end 54 and a second end 55. The first end 54 is axially and radially inward of the second end 55. The cord reinforced member or members 52,53 increase in radial distance from the axis of rotation of the tire 10 as a function of distance from its first end 54. In the illustrated FIG. 3, the cord reinforced member comprises two components 52,53 having a width of about 4 cm. The axially outer component 52 has a radially inner end 54 that is radially above with the outer edge 29 of the first and second bead cores 26. The axially inner component 53 has a radially inner end that is radially outward of the outer edge 29 of the bead core 26,26' by about 1 cm. The axially inner and axially outer components 52,53, preferably have nylon, rayon or steel cord reinforcement. The second end 55 of the cord reinforced member is located radially outward of the bead core 26 and radially inward of the termination of the turnup end 32 of the first ply 38.

The cords of members 52,53 are preferably inclined forming an included angle relative to the radial direction in a range from 25° to 75°, preferably 30°. If two members are employed, the cord angles are preferably equal but oppositely disposed. The cord reinforcement member 52,53 improves the handling characteristics of a car having an uninflated tire of the present invention. The members 52,53 greatly reduce the tendency for the car to oversteer, a significant problem encountered in conventional tires that are driven while uninflated or underinflated.

A fabric reinforced member 61 may be added to the bead regions 22 of the tire 10. The fabric reinforced member has first and second ends 62,63. The member is wrapped about the first and the second plies 38,40 and the bead core 26. Both the first and the second ends 62,63 extend radially above and outward of the bead core 26.

Figure 4:
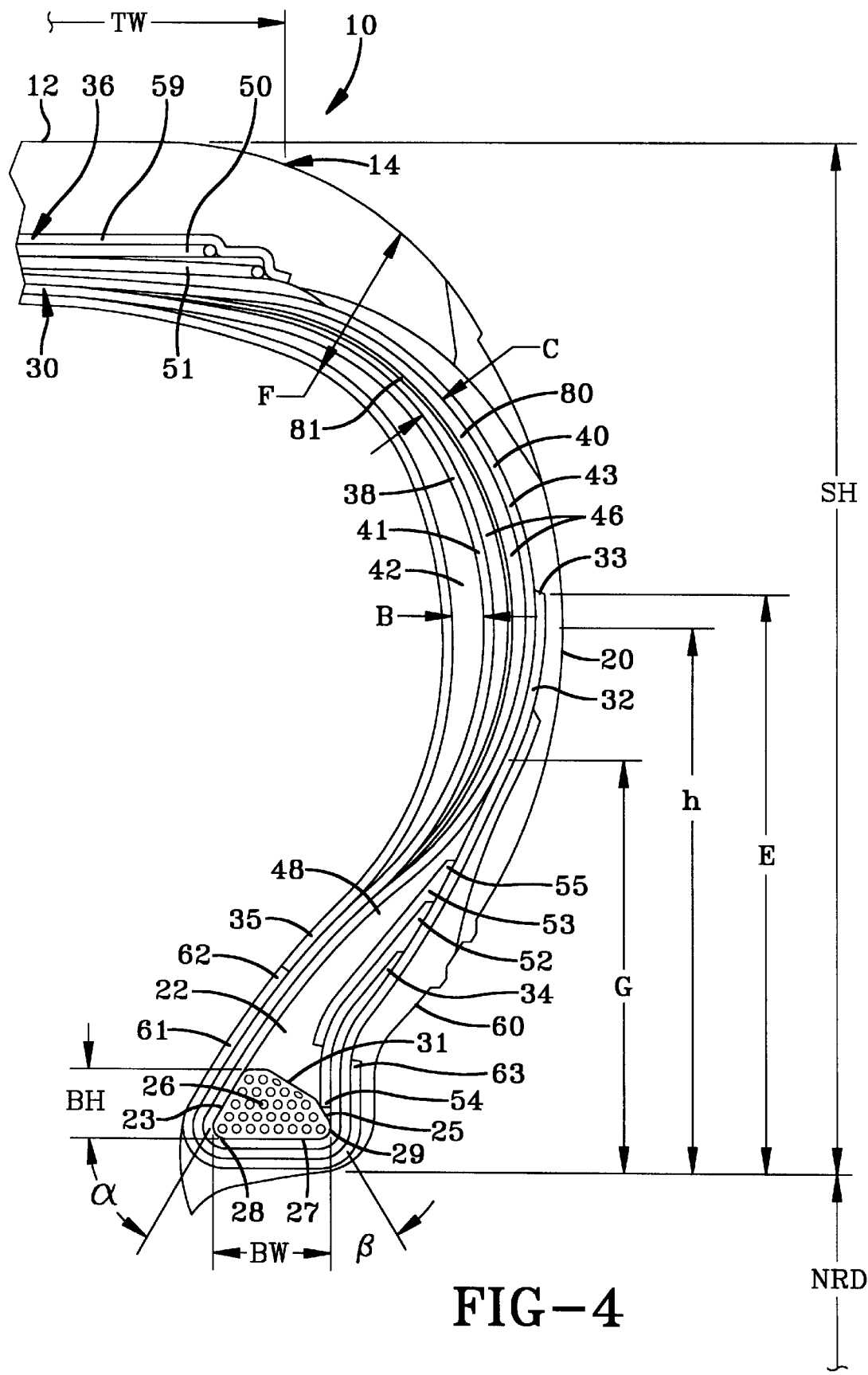
FIG. 4 is an alternative embodiment wherein the insert 42 or the multiple inserts 46 are cord reinforced.
Figure 5:
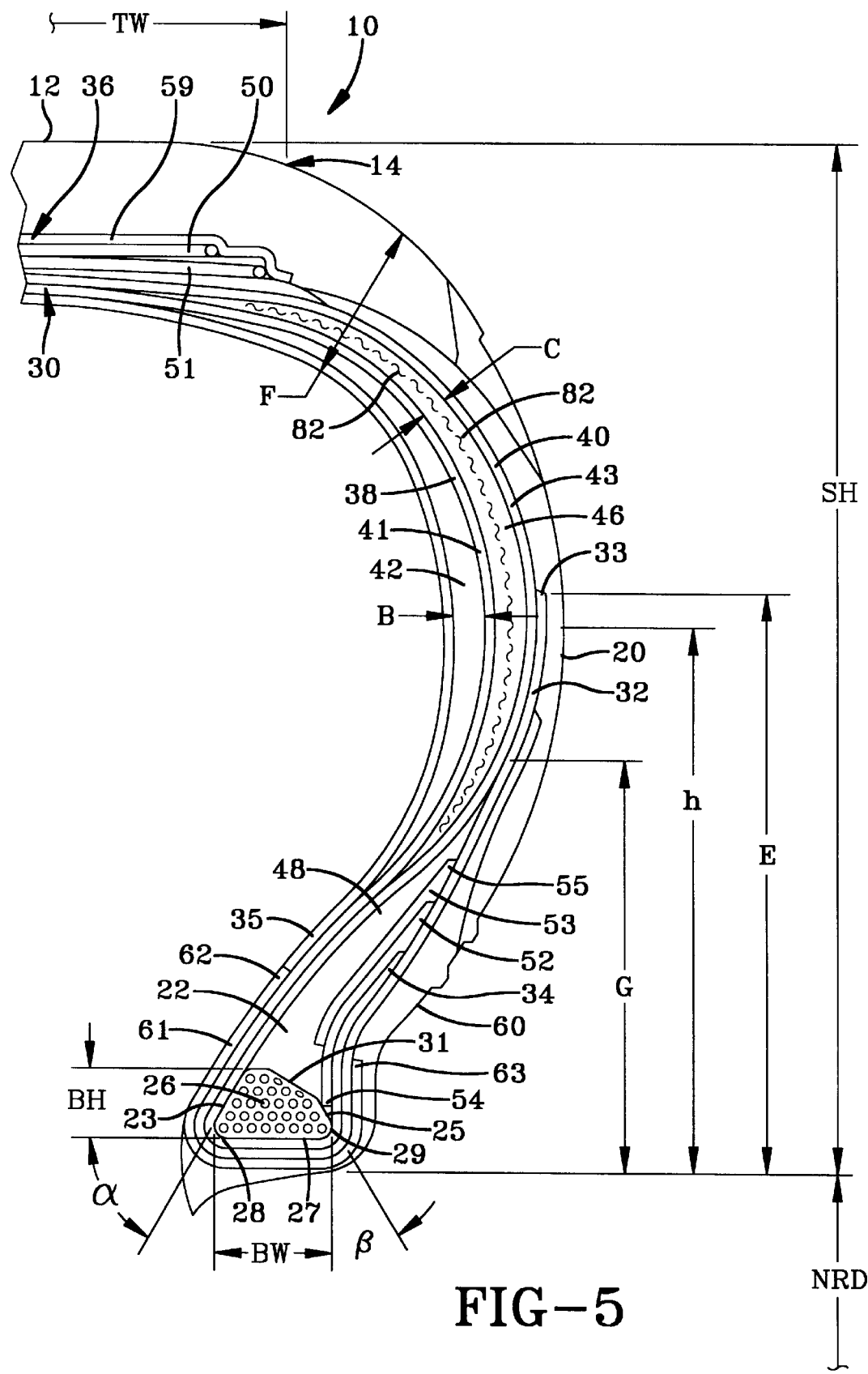
FIG. 5 is an alternative embodiment wherein the inserts 42 or 46 are short fiber loaded.

The sidewall portions 20 are provided with first fillers 42. The first fillers 42 may be employed between the innerliner 35 and the first reinforcement ply 38. The first fillers 42 extend from each bead region 22 radially to beneath the reinforcing belt structures 36. As illustrated in the preferred embodiment of the invention as shown in FIGS. 2, 4, and 5, the sidewall portions 20 may each include a first filler 42 and a second filler 46. The first fillers 42 are positioned as described above. The second fillers 46 are located between the first and the second plies 38,40 respectively. The second filler 46 extends from each bead region 22 radially outward to beneath the reinforcing belt structure 36.

For purposes of this invention, the maximum section width (SW) of the tire is measured parallel to the rotational axis of the tire from the axially outer surfaces of the tire, exclusive of indicia, adornment and the like. Also, for the purposes of this invention the tread width is the axial distance across the tire perpendicular to the equatorial plane (EP) of the tire as measured from the footprint of the tire inflated to maximum standard inflation pressure, at rated load and mounted on a wheel for which it was designed. In the particular embodiments illustrated in FIGS. 2A and 2B, the first fillers 42 each have a maximum thickness B of approximately 3 percent (3%) of the maximum section height SH at a location (h) approximately radially aligned the maximum section width of the tire.

The second fillers 46 have a maximum thickness C of at least one and one-half percent(1.5%) of the maximum section height of the tire 10 at the location radially above the maximum section width of the tire. In the preferred embodiment the elastomeric second fillers 46 each have a thickness C of approximately one and one-half percent (1.5%) of the maximum section height SH of the tire at a radial location of about 75% of the section height SH. For example, in a P275/40ZR17 size high performance tire the thickness C of the tire equals 0.08 inches (2 mm). At the location h, approximately radially aligned with the location of the maximum section width of the tire, the thickness of the second filler is 0.05 inches (1.3 mm).

The overall cross-sectional thickness of the combination of elastomeric fillers 42,46,and 48 preceding from the bead cores 26 to the radial location of the maximum section width (SW) is preferably of constant thickness. The overall sidewall and carcass thickness is about 0.45 inches (11.5 mm) at the maximum section width location E and increases to an overall thickness F, in the region where it merges into the shoulder near the lateral tread edges 14,16, F being about two hundred percent (200%) of the overall sidewall thickness as measured at the maximum section width SW of the tire. Preferably, the overall thickness F of the sidewall in the shoulder region of the tire is at least one hundred twenty five percent (125%) of the overall sidewall thickness at the maximum section width (SW), more preferable at least 150%. This ratio means that the sidewall can be made substantially thinner than the predecessor type runflat tires.

As in the conventional high performance type tires, the tires illustrated in the Figures of the various embodiment may enhance the high speed performance of the tire by the application of a fabric overlay layer 59 disposed about the tread reinforcing belt structure 36. For example, two ply layers having nylon or aramid cords may be disposed above each reinforcing belt structures 36, the lateral ends extending past the lateral ends of the belt structures 36. Alternatively, a single layer of spirally wound aramid reinforced fabric can be employed as an overlay. The aramid material has a substantially higher modulus of elasticity than nylon and accordingly results in a stronger tire reinforcement than two layers of nylon. Applicants have found that a greater than 10% increase in high speed capability can be achieved in a tire with the single layer of aramid overlay. Generally the use of aramid material in passenger tire applications is avoided due in part to the fact that the material exhibits poor noise properties that resonate sounds through the relatively thin sidewalls of the passenger tire. Applicants' tire of the present invention employs reinforced sidewalls which noticeably dampen tire generated noises. The noise dampening sidewalls permit the use of an aramid overlay without experiencing unacceptable noise levels.

As previously discussed, the tire of the present invention has the ply 38 having a turnup end 32 while the ply 40 can simply terminated adjacent to the bead core 26, alternatively the tire can be designed with both plies having turnup ends as was done in the earlier prior art tire of FIG. 1 and as is shown in FIG. 2A.

The first filler insert 42 is preferably made of elastomeric material. The first filler actually prevents the tire's sidewall from collapsing when operating under no inflation pressure the insert can be of a wide range of shore A hardnesses from a relative soft shore A of about 50 to very hard 85, the material shape and cross-sectional profile is modified accordingly to insure the ride performance and sidewall spring rate is acceptable. The stiffer the material the thinner the cross-section generally.

The second filler 46 can be of the same or different material physical properties relative to the first insert filler 42. This means that the combination of a hard second filler with a soft first filler is contemplated as well as the combination of a hard first filler 42 with a softer second filler 46. The elastomeric materials of the second filler 46 similarly are in the 50 to 85 shore A range.

The second fillers 46, as shown, are made of elastomeric material. These filler inserts 46 can be used in multiples of inserts interposed between adjacent plies when more than two plies are used in the carcass structure.

Alternatively, the inserts 46 and 42 may be cord reinforced themselves, in the embodiment of FIG. 4 the uses of adjacent fillers 46 is considered beneficial. The multiple adjacent cord 41,43 reinforced fillers 46 can be positioned such that the radially outer ends are either terminated under the belt structure while the radially inner ends terminate adjacent to the bead cores 26 or are wrapped around the bead cores 26, similar to a ply. The inserts 46 may alternatively be loaded with short fibers 82 as shown in FIG. 5, the fibers being preferably oriented at an angle of at least 45° to enhance the radial and lateral stiffness of the insert, preferably the fibers are radially oriented. Preferably the cords 41,43 or short fibers 82 are made of rayon, synthetics such as polyester or aramid, or carbon. These cords 41,43 or short fibers 82 can be radially directed or positioned at bias angles preferably at least 45° but should not be circumferentially extending.

The second fillers 46 when unreinforced act as a spacer between the adjacent plies 38,40. The cords of the plies particularly the radially outer ply 40 is placed in tension when the tire is operated uninflated. When reinforced the fillers 46 also contributed to the sidewall supporting structure.

As shown, in FIGS. 3A, 3B or 3C the sidewalls when deflected under no inflation pressure or even when inflated, place the radially outer cords 41 or 43 into tension while the radially inner cords 41 or 43 when experiencing a downward load try to locally compress the cords 41,43 when the tire is deflated or deflected.

This loading feature is the same for this inventive tire 10 as it was in the prior art tire 100 structure of FIG. 1 and described by U.S. Pat. No. 5,368,082. By changing the modulus of the cords 41,43 in the plies 38,40 wherein the cords in one ply structure has modulus different from the other ply structure, preferably substantially different a surprisingly substantial increase in runflat durability can be achieved with the added benefit of ride performance improvements as evidenced in the preferred embodiment tire 10 of FIG. 3B.

The tire 10 as described above enables the tire designer to tune a particular tire's design features to achieve a soft luxurious feel to a stiffer more performance feel. Furthermore, the unique combination described above permits tires to be built having higher aspect ratios than heretofore was practical. The combination of unique features means that the designer can choose between extended runflat performance or tire weight reductions as well.

Figure 6A:
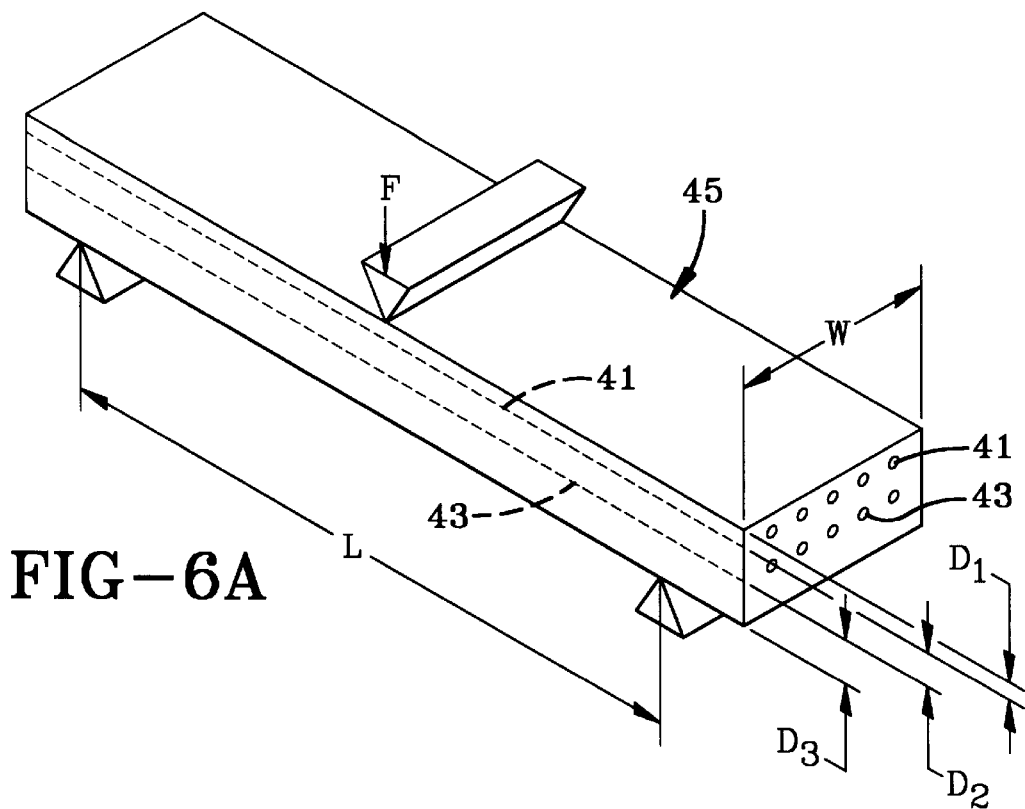
FIGS. 6A and 6B are views of a composite material having cords of differing moduli.
Figure 6B:
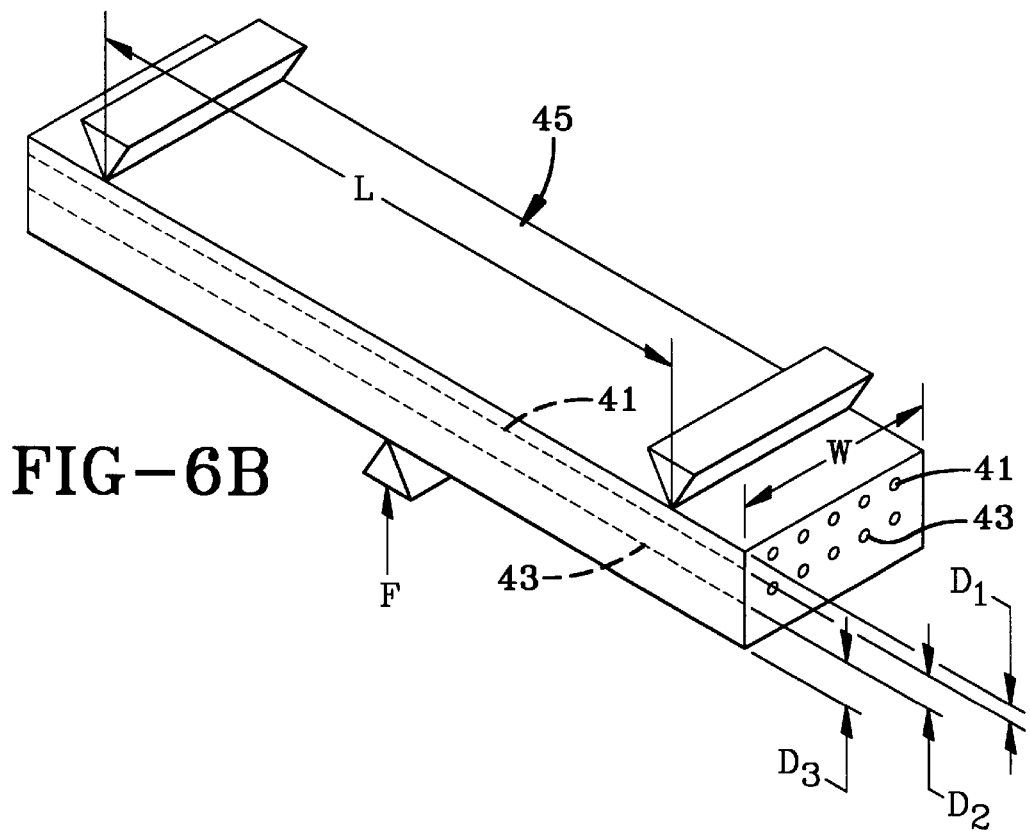

For a better appreciation of the inventive concept a composite test sample structure 45 was constructed as shown in FIGS. 6A and 6B. For simplification the rubber layers were all of the same type with the same properties. The reinforcement parallel cords 41 were located at a depth D1 of 3.1 mm and were rayon cords having a modulus 13 GPa and end per inch (epi) count of 30. The reinforcement parallel cords 43 were steel cord of a 1+5×0.18 mm construction at 18 epi and were oriented parallel to the rayon cords 41 and were embedded in the rubber spaced at a distance D2 of 6.34 mm from the rayon cords 41, the steel cords 43 also being a distance of D3 of 8.32 mm from the bottom of the sample 45. The test sample 45 had a test span or length at load points of 152.4 mm and a width of 38 mm. The thickness was the sum D1,D2,D3.

The rectangular test sample 45 was first loaded as shown in FIG. 6A and at a deflection of 10 mm a load of 64 N (newtons) was recorded. The sample 45 was then loaded as in FIG. 6B the reversal of the top and bottom loads at the resultant deflection at 10 mm required a load of 136 N (newtons). A second test sample identical to the first sample but with only 2 layers of rayon cords 41 was loaded as in FIG. 6A, the resultant load being only 20 N (newtons).

The all rayon ply sample 45 is similar to the prior art runflat sidewall structure shown in FIG. 1 having two rayon plies. This test evidenced that a composite have two layers of cords of greatly different modulus can result in a large difference in bending stiffness depending on the direction of load. The load in FIGS. 6A and 6B created a tensioning or compression of the cords 41,43 dependent on the direction the load was applied.

The application of this principal to a test tire of a size P235/55R17 was next tried. The tire 100 of FIGS. 1 and 3A being the prior art tire having only rayon cords in plies 380,400 was used as a control tire. The same construction and size tire was tested in the construction of FIG. 3B wherein the cords 43 of the ply 40 were the 1+5×0.18 mm steel cords having an epi of 18 was radially outward of the rayon cords 41 of ply 38 which was the same as the ply 380 of the prior art tire. All other construction materials were the same for the control tire 100 and the first test tire 10. The rayon plied control tire 100 had an effective spring rate at 26 psi of 1516 pounds/inch, at 35 psi a spring rate of 1787 pounds/inch. The first test tire had a 26 psi inflated spring rate of 1541 lbs./in. and at 35 psi a rate of 1816 lbs./in. At 0 psi inflation the spring rate of the first test tire was 773 lbs./in. A second test tire was constructed wherein the rayon cords 41 were placed in ply 40 and were radially outward of the steel cords 43 of the ply 38 as shown in FIG. 3C. This second test tire had spring rates at 26 psi and 35 psi of 1557 and 1847 respectively. At 0 inflation the spring rate of the second test tire was 789 lbs./in.

Two of each of the test and control tires were then lab tested at a load of 1000 pounds. Each tire is tested to failure. The all rayon control tires failed at 33.7 and 32.8 mi. The steel and rayon corded first test tires failed at 48.5 and 51.7 miles. The rayon and steel corded second test tire had runflat mileage of 32.4 and 28.4 miles.

The results indicated that the tires runflat performance could be increased using this inventive concept. The results further evidenced that the tires weight could be reduced if an increase in runflat mileage was not considered as critical as other performance features.

Surprisingly, the second test tires' poor runflat performance was considered potentially very encouraging in that the steel cords 43 were placed in compressive loads but survived due in large part to the inserts preventing the cords from locally buckling. Applicants believe that the steel cords can be increased in cord diameter such that the steel will act like compression reinforcement members capable of supporting the tire, similar to rebar steel used in concrete. The tire when inflated would be tuned for a soft ride but when run uninflated the larger diameter steel cord in compression can assist the radially outer cord 41 of a lower modulus. The obvious advantage of the steel cords is that as the tire runs uninflated heat builds up and the steel cords are virtually unaffected by the heat, whereas, synthetic cords soften and elongate. This means that the runflat tire performance can potentially be sustained until the rubber reinforcements 42,46 degenerate. This can be a substantially longer duration than when the synthetic cords start to stretch causing the tire to collapse.

The use of two steel cord 43 reinforced plies 38,40 was evaluated as an early attempt to achieve the runflat performance. That tire had a very high spring rate and posed some questions as to compression cord fatigue of the radially inner ply at locations under the belts. The use of a synthetic or textile cord that is extensible relative to the steel cord eliminates such concerns regardless of the radial locations chosen for the cords 41 or 43 of the two plies 38,48. Furthermore, the ride performance is well within acceptable limits as demonstrated by the spring rates of the tire.

As previously stated the inventors believe that the use of the steel cords 43 in the radially inner ply 38 may be even more beneficial than the case where the steel cord ply is the radially outer ply 40. The reason is that the spring rate can be further lowered while the steel cord 43 being embedded in the rubber insert works like a compression load carrying member stiffening the sidewall when the tire is operated without air. The steel cord being surrounded by the rubber is greatly limited in flexure but is capable of additional sidewall load carrying support.

Furthermore, the use of inserts reinforced with cords 80 or short fibers 82 can further provide additional compression stiffness to enhance the runflat performance.

Naturally the difference in the cord modulus between the plies is considered an essential factor in achieving these dramatic results.

The sidewall 200 as shown in FIG. 3A has a bending axis (A) shown in dotted lines for the prior art rayon ply structure. The bending axis (A) is substantially centered about the insert filler 460.

The sidewall 20 of the tire 10 according to the invention as shown in both FIGS. 3B and 3C has the bending axis (A) in close proximity to the high modulus cords 43 that are substantially inextensible and distanced from the lower modulus cords (41) that are reasonably extensible compared to the high modulus cords (43).

Ideally, the spring rate of the tire 10 in the inflated condition should not change appreciably from that of a conventional non-runflat pneumatic tire. When the runflat tire is operated in the uninflated state the spring rate must be sufficient to prevent the tire from buckling or collapsing onto itself.

Runflat performance of the tire 10 may be further enhanced by providing the ply coat of each layer of the reinforcing ply structures 38,40 with an elastomeric material having substantially the same physical properties as that of the elastomeric fillers 42,46. As is well known to those skilled in the tire art, the ply coat of a fabric layer is the layer of unvulcanized elastomeric material which is applied to fabric prior to its being cut to its desired shape and applied to the tire on the tire building drum. In many applications it is preferable that the elastomeric material used as a ply coat for the ply layers is similar to the elastomeric material used in the reinforcing fillers 42,46.

In practice, the rubber compositions for the first fillers 42, second fillers 46 and the ply coats for one or more ply structures 38 and 40 utilized in this invention for the aforesaid pneumatic tire construction are preferably characterized by physical properties which enhance their utilization in the invention which are, collectively, believed to be a departure from properties of rubber compositions normally used in pneumatic tire sidewalls, particularly the combination of first and second fillers 42 and 46 with plies 38 and/or 40 having a combination of either dissimilar or similar high stiffness yet essentially low hysteresis properties as hereinafter described.

Preferably, while the discussion herein refers to the ply coat(s) being for one or more of ply structures 38 and 40, in the practice of this invention, the plycoats referenced herein refers to plycoats for both plies 38 and 40 unless only one of such plies is used.

In particular, for the purposes of this invention, both of the aforesaid fillers 42 and 46 were evaluated by having a high degree of stiffness yet by also having a relatively low hysteresis for such a degree of stiffness. This enabled the benefits of the change in moduli of the reinforcing cords 41,43 to be fully appreciated.

The stiffness of the rubber composition for fillers 42 and 46 is desirable for stiffness and dimensional stability of the tire sidewall.

The stiffness of the rubber composition for the ply coat for one or more of plies 38 and 40 is desirable for overall dimensional stability of the tire carcass, including its sidewalls, since it extends through both sidewalls and across the crown portion of the tire.

However, it is to be appreciated that rubbers with a high degree of stiffness in pneumatic tires normally be expected to generate excessive internal heat during service conditions (operating as tires on a vehicle running under load and/or without internal inflation pressure), particularly when the rubber's stiffness is achieved by a rather conventional method of simply increasing its carbon black content. Such internal heat generation within the rubber composition typically results in a temperature increase of the stiff rubber and associated tire structures which can potentially be detrimental to the useful life of the tire.

The hysteresis of the rubber composition is a measure of its tendency to generate internal heat under service conditions. Relatively speaking, a rubber with a lower hysteresis property generates less internal heat under service conditions than an otherwise comparable rubber composition with a substantially higher hysteresis. Thus, in one aspect, a relatively low hysteresis is desired for the rubber composition for the fillers 42 and 46 and the plycoat(s) for one or more of the plies 38 and 40.

Hysteresis is a term for heat energy expended in a material (eg: cured rubber composition) by applied work and low hysteresis of a rubber composition is indicated by a relatively high rebound, a relatively low internal friction and relatively low loss modulus property values.

Accordingly, it is important that the rubber compositions for one or more of the fillers 42 and 46 and plycoats for one or more of plies 38 and 40 have the properties of both relatively high stiffness and low hysteresis.

The following selected desirable properties of the rubber compositions for the fillers 42 and 46 as well as for the plycoats for one or more of the plies 38 and 40 are summarized in the following Table 1.

TABLE 1

| Properties | Filler | Ply Coat |
|---|---|---|
| Hardness (Shore A)[2] | 50–85 | 50–85 |
| Modulus (100%) MPa[3] | 5–7 | 4–6 |
| Static Compression[1] | 0.1–0.15 | 0.15–0.2 |
| Heat Buildup (°C.)[1] | <30 | <30 |
| Cold Rebound (about 23° C.)[4] | 55–70 | 55–70 |
| E' at 100° C. (MPa) | 10–15 | 10–15 |
| E" at 100° C. (MPa) | 0.5–1.5 | 1–1.5 |

[1]Goodrich Flexometer Test-ASTM Test No. D623
[2]Shore Hardness Test-ASTM Test No. D2240
[3]Tension Modulus Test-ASTM Test No. D412
[4]Zwick Rebound Test-DIN 53512

The indicated hardness property is considered to be an expanded range of moderate rubber hardness permitted by the use of the unique ply cord structure.

The indicated modulus property at 100% modulus is utilized instead of a 300% modulus because the cured rubber has a relatively low ultimate elongation at its breaking point. Such a cured rubber is considered stiff.

The indicated static compression property, measured on a flexometer, is another indication of the relatively high stiffness of the cured rubber.

The indicated E' property is a coefficient of the storage or elastic moduli component of the viscoelastic property which is an indication of the material (eg: cured rubber composition) stiffness.

The indicated E" property is a coefficient of the loss or viscous moduli component of the viscoelastic property which is an indication of the hysteretic nature of the material (eg: cured rubber composition).

The utilization of both the E' and E" properties to characterize stiffness and hysteresis of rubber compositions is well known to those having skill in such characterizations of rubber.

The indicated heat buildup value is measured by a Goodrich flexometer (ASTM D623) test and is indicative of the internal heat generation of the material (eg: cured rubber composition).

The indicated cold rebound test property at about 23° C. (room temperature) is measured by Zwick Rebound Test (DIN 53512) test and is indicative of the material's (eg: cured rubber composition) resilience.

Thus, the properties illustrated in Table 1 indicate a cured rubber composition with a relatively high stiffness, moderate hardness and a relatively low hysteresis for a rubber with such a high stiffness.

The low hysteresis is demonstrated by the relatively low heat buildup, low E" and high rebound properties and is considered necessary for a rubber composition desired to have a relatively low internal heat buildup in service.

In the compounding of the various tire components, various rubbers may be used which are, preferably, relatively high unsaturation diene-based rubbers. Representative examples of such rubbers are, although they may not be so limited, are: styrenebutadiene rubber, natural rubber, cis 1,4 and 3,4-polyisoprene rubbers, cis 1,4 and vinyl 1,2-polybutadiene rubbers, acrylonitrile-butadiene rubber, styrene-isoprene-butadiene rubber and styrene-isoprene rubber.

Various of the preferred rubbers for the rubber compositions for the fillers 42 and 46 and for the plycoat(s) for one or more of the plies 38 and 40 are natural cis 1,4-polyisoprene rubber, isoprene/butadiene rubber, and cis 1,4-polybutadiene rubber.

Preferred combinations, or blends, of rubbers are natural cis 1,4-polyisoprene rubber and cis 1,4-polybutadiene rubber for the fillers and natural cis 1,4-polybutadiene rubber and isoprene/butadiene copolymer rubber for the plycoat(s).

In a preferred practice, based on 100 parts by weight rubber, (A) the fillers are comprised of about 60 to 100, preferably about 60 to 90, parts natural rubber and, correspondingly, up to about 40, preferably about 40 to about 10, parts of at least one of cis 1,4 polybutadiene rubber and isoprene/butadiene rubber preferably cis 1,4-polybutadiene rubber, where said isoprene/butadiene rubber, if used, is present in a maximum of 20 parts, and (B) the said plycoat(s) are comprised of up to 100, preferably about 80 to about 100 and more preferably about 80 to about 95, parts natural rubber and, correspondingly, up to about 100, preferably up to about 20 and more preferably about 20 to about 5, parts of at least one of isoprene/butadiene copolymer rubber and cis 1,4 polybutadiene rubber, preferably an isoprene/butadiene rubber; wherein the ratio of isoprene to butadiene in said isoprene/butadiene copolymer rubber is in a range of about 40/60 to about 60/40.

It is further contemplated, and is considered to be within the intent and scope of this invention that a small amount, such as about 5 to about 15 parts, of one or more organic solution polymerization prepared rubbers may be included with the aforesaid natural rubber, and cis 1,4 polybutadiene rubber and/or isoprene/butadiene rubber composition(s) for the said fillers and/or plycoat(s), of which the option and selection of such additional rubber(s) can be made by one having skill in the rubber compounding art without undue experimentation.

Thus, in such circumstance, the description of the filler and plycoat rubbers is set forth in a "comprising" manner with the intent that small amounts of such solution polymerization prepared elastomers can be added so long as the aforesaid physical property parameters of the cured rubber compositions are met. It is considered that such rubber compounding is within the skill of those with experience in the rubber compounding art without undue experimentation.

While not necessarily limited thereto, such other contemplated solution prepared rubbers are styrene/butadiene, and polymers of one or more of isoprene and butadiene such as 3,4-polyisoprene, styrene/isoprene/butadiene terpolymers and medium vinyl polybutadiene.

It should readily be understood by one having skill in the art that rubber compositions for components of the pneumatic tire, including the first and second fillers 42 and 46 as well as ply coat(s) for one or more or plies 38 and 40, can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as rubber processing oils, resins including tackifying resins, silicas, and plasticizers, fillers, pigments, stearic acid or other materials such as tall oil resins, zinc oxide, waxes, antioxidants and antiozonants, peptizing agents and reinforcing materials such as, for example, carbon black. As known to those skilled in the art, depending on the intended use of the sulfur vulcanizable and sulfur vulcanized materials (rubbers), the certain additives mentioned above are selected and commonly used in conventional amounts.

Typical additions of carbon black comprise about 30 to about 100 parts by weight, of diene rubber (phr), although about 40 to about a maximum of about 70 phr of carbon black is desirable for the high stiffness rubbers desired for the indicated fillers and plycoat(s) used in this invention. Typical amounts of resins, if used, including tackifier resins and stiffness resins, if used, including unreactive phenol formaldehyde tackifying resins and, also stiffener resins of reactive phenol formaldehyde resins and resorcinol or resorcinol and hexamethylene tetramine may collectively comprise about 1 to 10 phr, with a minimum tackifier resin, if used, being 1 phr and a minimum stiffener resin, if used, being 3 phr. Such resins may sometimes be referred to as phenol formaldehyde type resins. Typical amounts of processing aids comprise about 4 to about 10.0 phr. Typical amounts of silica, if used, comprise about 5 to about 50, although 5 to about 15 phr is desirable and amounts of silica coupling agent, if used, comprise about 0.05 to about 0.25 parts per part of silica, by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl) tetrasulfide and bis-(3-trimethoxy-silylpropyl) tetrasulfide grafted silica from DeGussa, AG. Typical amounts of antioxidants comprise 1 to about 5 phr. Representative antioxidants may be, for example, diphenyl-p-phenylenediamine and others, such as those disclosed in the Vanderbilt Rubber Handbook (1978), pages 344–346. Suitable antiozonant(s) and waxes, particularly microcrystalline waxes, may be of the type shown in the Vanderbilt Rubber Handbook (1978), pages 346–347. Typical amounts of antiozonants comprise 1 to about 5 phr. Typical amounts of stearic acid and/or tall oil fatty acid may comprise about 1 to about 3 phr. Typical amounts of zinc oxide comprise about 2 up to about 8 or 10 phr. Typical amounts of waxes comprise 1 to about 5 phr. Typical amounts of peptizers comprise 0.1 to about 1 phr. The presence and relative amounts of the above additives are not an aspect of the present invention which is primarily directed to the utilization of specified blends of resins in tire treads as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 8 phr with a range of from 3 to about 5 being preferred for the stiff rubbers desired for use in this invention.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 3 phr. In another embodiment, combinations of two or more accelerators in which a primary accelerator is generally used in the larger amount (0.5 to about 2 phr), and a secondary accelerator which is generally used in smaller amounts (0.05–0.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound, although a second sulfenamide accelerator may be used. In the practice of this invention, one and sometimes two, or more accelerators are preferred for the high stiffness rubbers.

The tire can be built, shaped, molded and cured by various methods which will be readily apparent to those having skill in the art.

As disclosed, the test tires 10 and the prior art tires 100 were constructed using the physical properties of the ply coat and the inserts as disclosed in the prior art patent. The tire 10 of the present invention contemplates using a wider range of materials of differing physical properties such that the fillers 42, 46 and 48 and the plycoats for the plies 38,40 may each be distinctively different and selected for the desired ride, handling and runflat performance needed. In other words, the designer can selectively tune the materials individually to achieve to desired tire performance. For simplicity of understanding the inventive contribution of these tires the materials were identical between the control tire 100 and the test tires 10 with the exception of the cords 43 of higher modulus.

EXAMPLE 1

The following rubber compositions are provided which are intended to exemplary of rubber compositions with properties which can fall within those exemplified in Table 1.

Rubber compositions are prepared and mixed by conventional rubber mixing processes and comprised of the materials shown in Table 2 which represent rubber compositions which may be contemplated for use as fillers 42 and 46 and ply coat(s) for one or more of plies 38 and 40. The indicated amounts of materials have been rounded for the illustration of this Example.

TABLE 2

| | (Parts by Weight) | |
|---|---|---|
| Material | Plycoat | Filler |
| Natural Rubber[1] | 90 | 80 |
| Isoprene/Butadiene Rubber[2] | 10 | 0 |
| Polybutadiene (cis 1,4-) Rubber[3] | 0 | 20 |
| Carbon black | 55 | 55 |
| Silica & Coupler | 6 | 6 |
| Zinc Oxide | 5 | 8 |
| Accelerators (Sulfenamide type) | 4 | 2 |
| Sulfur (insol w/20% oil) | 2 | 4 |

[1] Cis 1,4-polyisoprene type
[2] Copolymer with ratio of isoprene to butadiene of about 1:1
[3] A high cis 1,4-polybutadiene rubber The rubber compositions are molded and cured at about 150° C. for about 20 minutes.

In the practice of this invention, it is considered important that the rubber compositions for one or both the fillers 42 and 46 and the ply coat(s) for one or more of plies 38 and 40 are relatively very stiff, moderately hard, and have a low hysteresis.

Further, it is normally desired that the rubber composition for fillers 42 and 46, relative to the rubber composition for plycoats for plies 38 and/or 40 is slightly stiffer, slightly harder and that both of the rubber compositions have a relatively low hysteresis.

It is important to appreciate that the indicated physical properties of the rubber compositions in Table 1 are for samples thereof and that the dimensions, including thickness, of the resulting tire components (fillers and plies) need be taken into account as factors contributing to the overall stiffness and dimensional stability of the tire sidewall and carcass.

It is considered important that the stiffness of the rubber composition for fillers 42 and 46 is somewhat greater than that of the aforesaid ply coat rubber composition because they are not a part of a fabric reinforced ply and further, because it is desired to somewhat maximize their stiffness property.

The hysteresis, or E", and heat buildup values for the rubber composition for the aforesaid fillers is desirably somewhat lower than that for the rubber composition for the aforesaid ply coat(s) because of the bulk of the fillers versus the thin dimensions of the fabric reinforced plies.

Chafing of the tire in the lower bead region radially outward of the carcass structure 30 adjacent the rim flange may be minimized, especially during use of the tire in the uninflated condition, by providing hard rubber chafer portion 60.

FIGS. 7 through 10 show alternative embodiments of practicing the invention.

Figure 7:
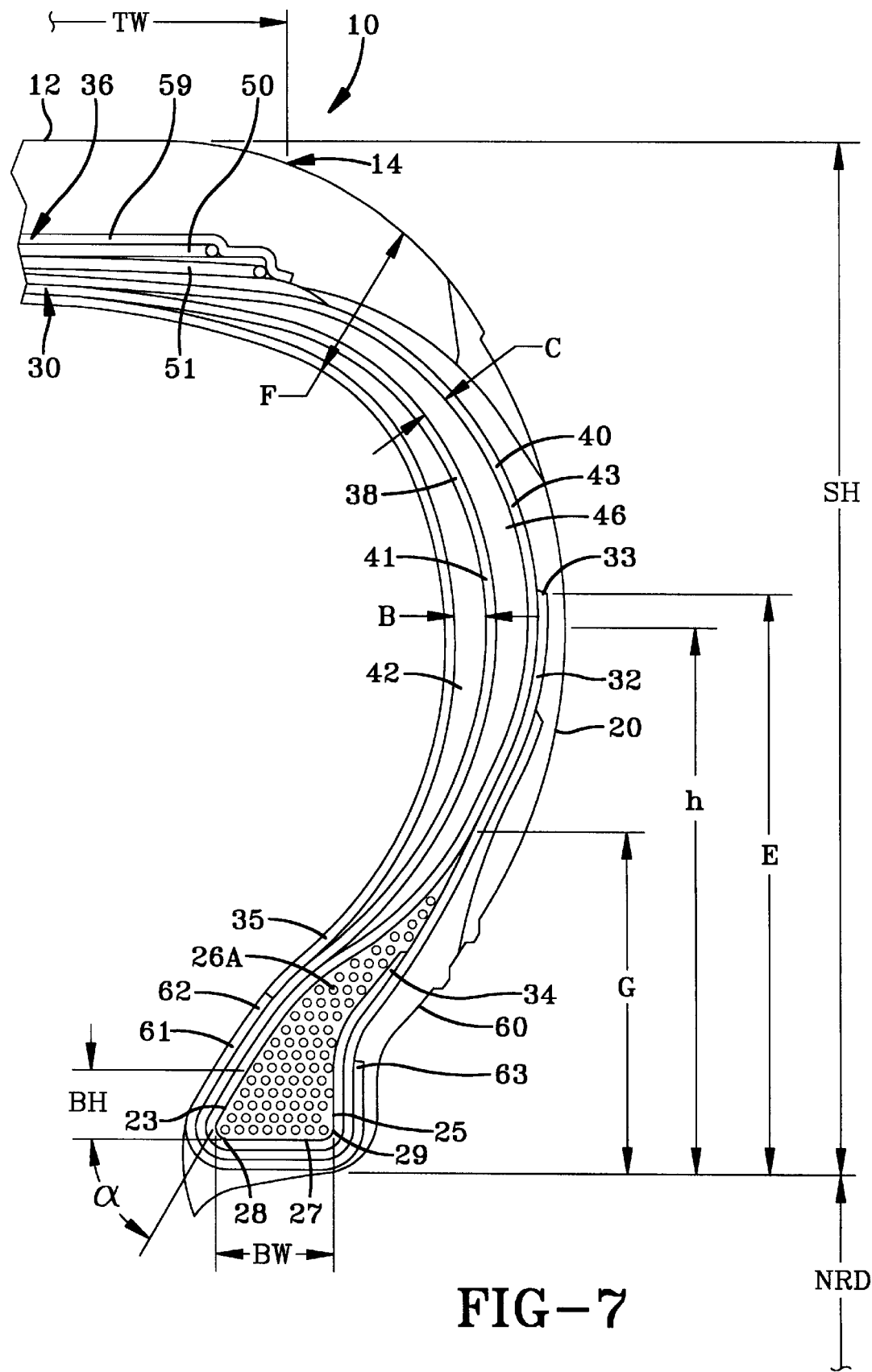
FIG. 7 is an alternative embodiment wherein the bead core 26A is extended and the apex 48 and the cord reinforcements 52,53 of the lower sidewall 20 are eliminated.

In FIG. 7 a unique extended bead core 26A is shown. The bead core 26A when used in a tire sidewall 20 eliminates the need for a cord reinforcement and a hard elastomeric apex. The bead core 26 although having very wide lower portion cross-section similar to the bead core 26 additionally has a radially outer portion that is generally triangularly shaped or tapered while further being slightly cantilevered laterally outwardly and extending above the rim flange when mounted to the tires design rim.

The bead 26A when configured as described above acts like a very stiff spring resisting lateral and compressing loads. This enables the tire's bead to effectively remain seated while permitting the tire designer to eliminate several lower sidewall stiffening members.

Depending on the tire application the bead core 26 or 26A could be made from a mono or multifilaments of steel of round, rectangular or parallel face cross-sectional shape when very high load requirements dictate or alternatively it could be made of a composite material reinforced by synthetic cords of material embedded in the resin of the composite. For example, the bead could be made from epoxy or other polymer reinforced with fiberglass or steel or textile cords, graphite or other composite structures of high flexibility while also being substantially inextensible. As is readily apparent, the use of the bead core 26A eliminates the need for a bead filler 48 and the cord reinforcements 52,53 in the lower sidewall. This simplifies manufacturing of the runflat tire 10.

As shown, the tire of FIG. 7 could employ the structure as described in the prior art tire 100 or could be used in combination with any of the tires of the present invention as described above.

Figure 8A:
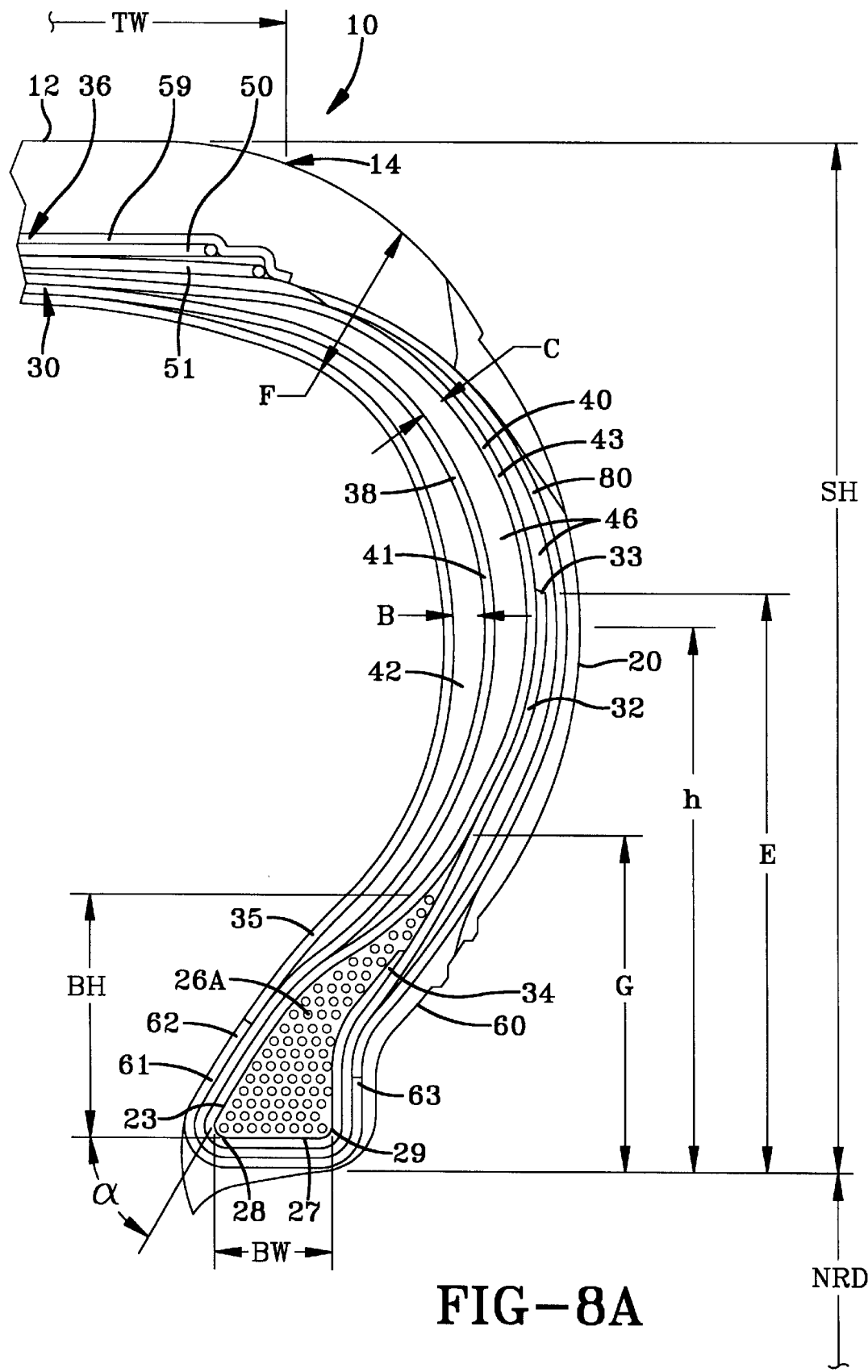
FIG. 8A discloses an alternative embodiment wherein a cord reinforced insert 80 is placed radially outward of the ply 40.
Figure 8B:
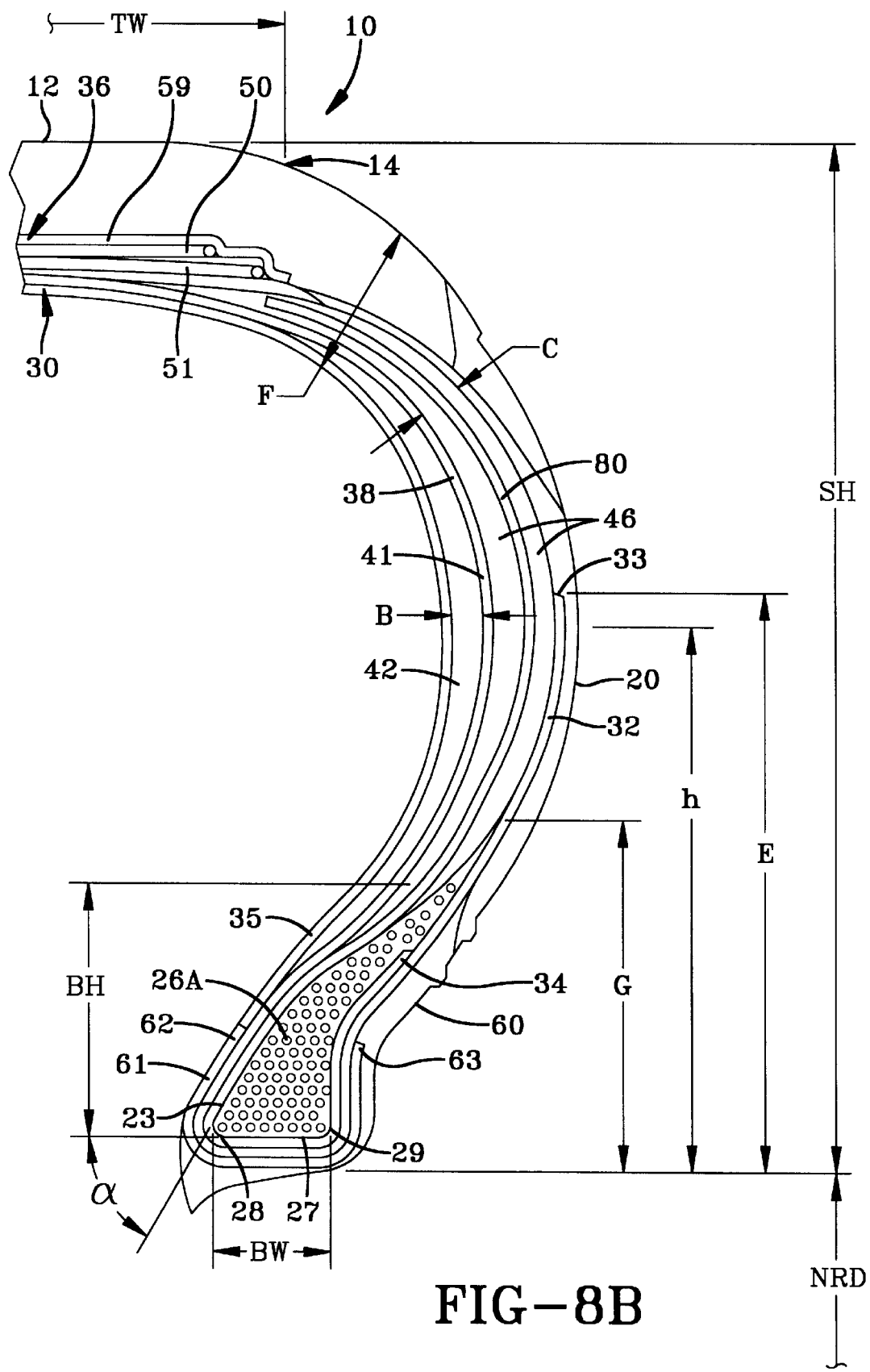
In FIG. 8B the insert 80 is interposed between the two fillers 46.

In FIG. 8A the tires of FIGS. 2A or 2B can be modified by simply adding a cord reinforced insert 80 radially outward of the ply 40 and another insert 46 which itself can be an unreinforced elastomeric, or cord reinforced or short fiber reinforced. As shown, this insert acts as a ply in the sidewall because the ends are extended to the belts 36 terminating directly under the belt structure 51 and radially inwardly to the bead core 26 being wrapped about the bead and plies 38,40 as shown or having its ending wrapped by a ply turnup. When employed as shown the insert can replace the fabric chipper 61. The advantage of this construction is that additional load carrying support can be gained without requiring a full ply. Alternatively, the insert 80 can be interposed between two fillers 46 and plies 38 and 40 as shown in FIG. 8B.

Figure 9:
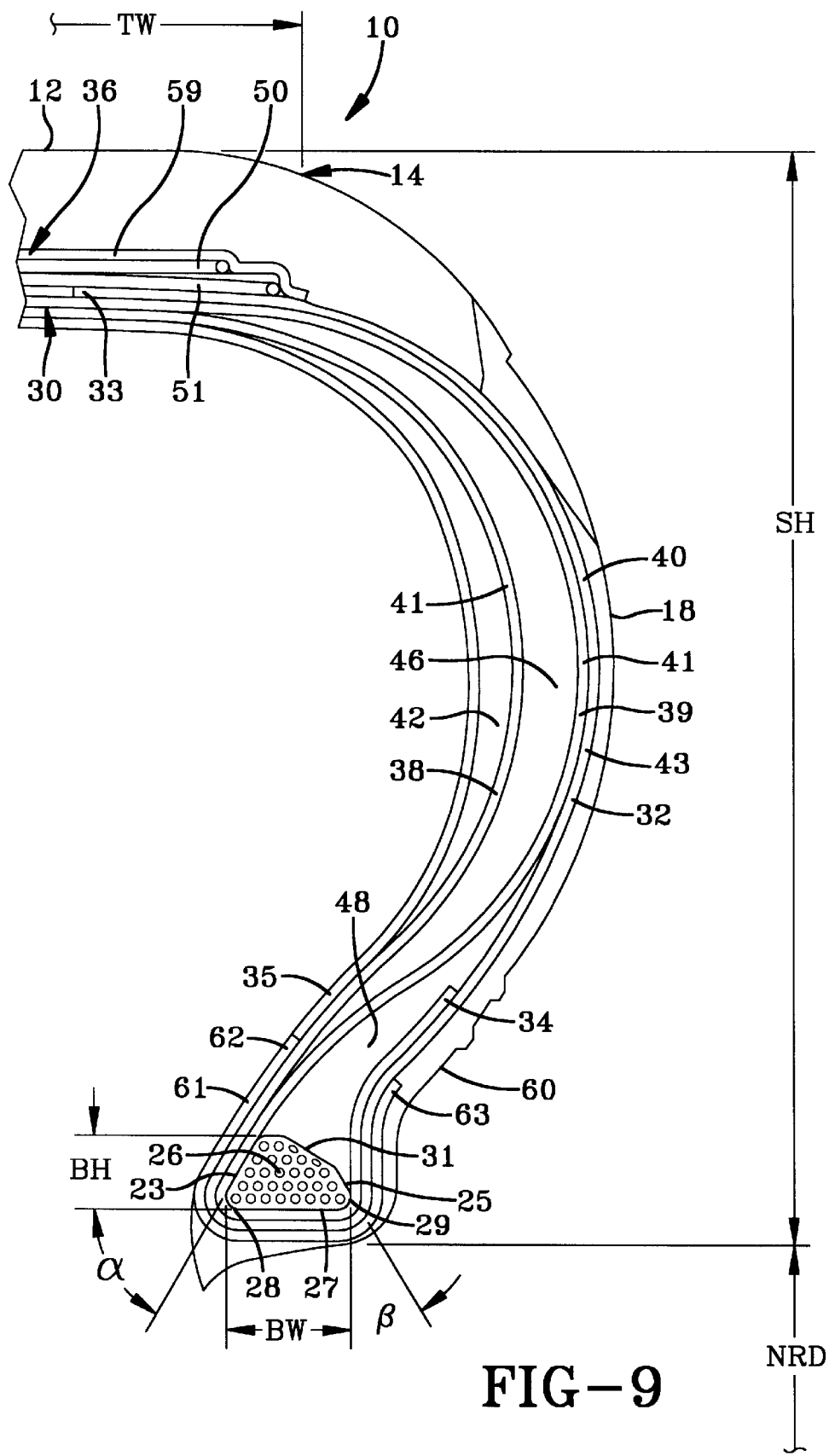
FIG. 9 is an alternative embodiment showing two inserts and three plies.
Figure 10:
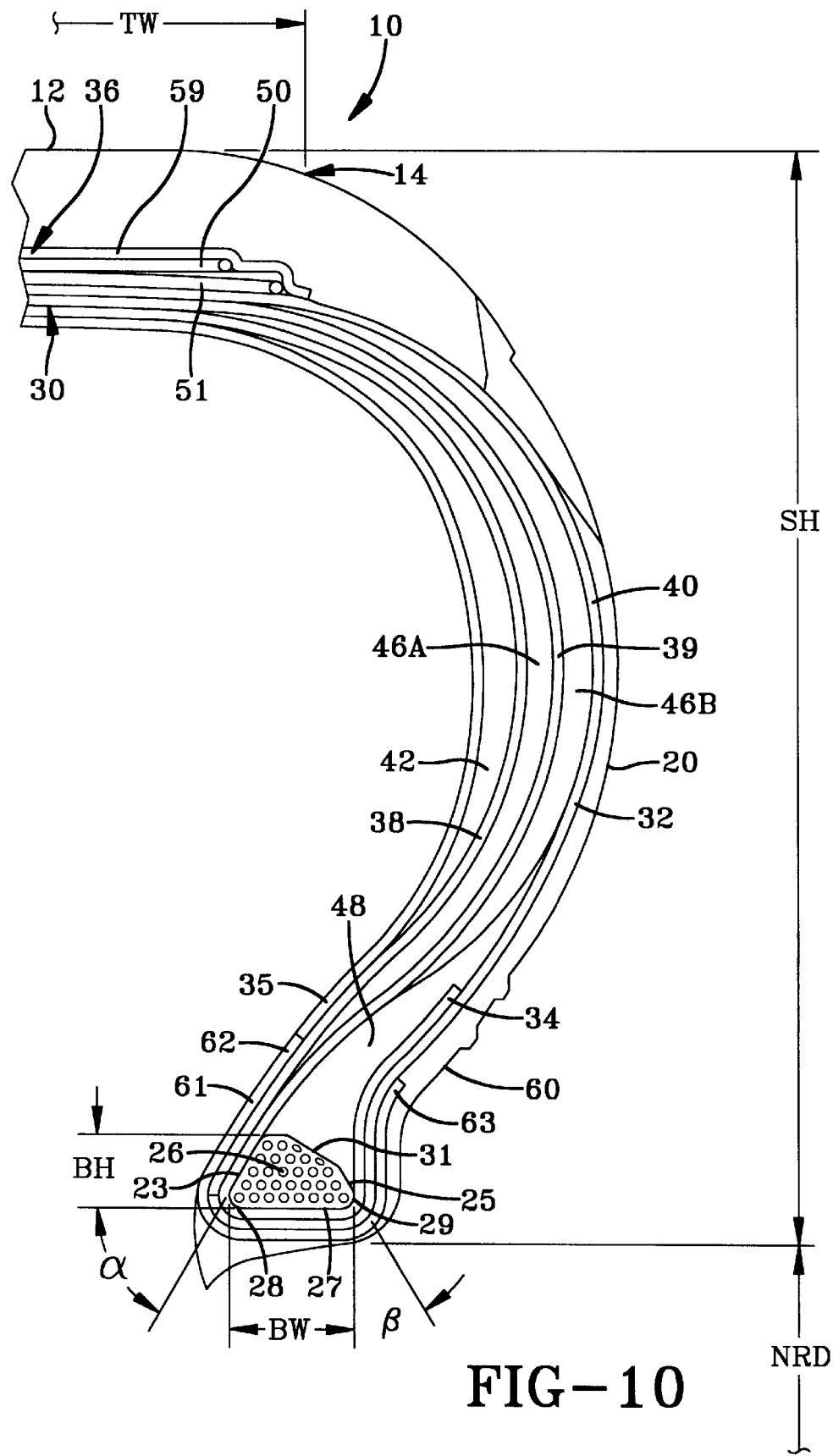
FIG. 10 is an alternative embodiment showing three inserts and three plies.

In FIG. 9 another embodiment shows the use of three plies 38,39,40 with two inserts 42,46. FIG. 10 shows the configuration wherein three plies 38,39,40 and three inserts 42,46A and 46B can be used. In every case, the runflat performance is believed to be improved if one ply 40 has cords with a modulus substantially greater than the modulus of the other plies 38,39. Furthermore, as described previously any of the plies 38,39,40 employed could have the higher modulus cords 43 relative to the other plies.

Figure 11A:
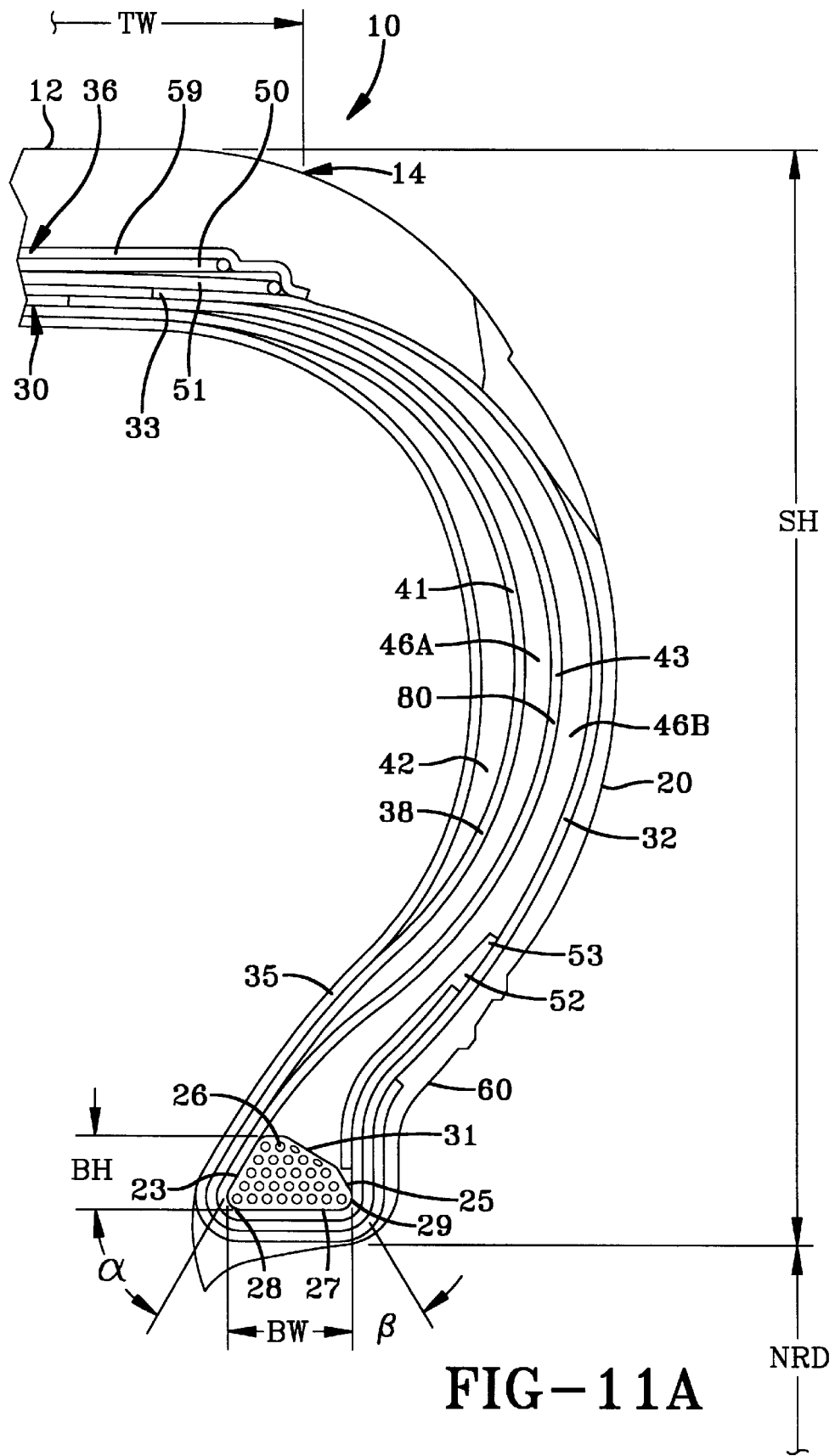
FIG. 11A is an alternative embodiment showing one ply 38 extending bead core 26 to bead core 26 and one insert 80 with cord reinforcement functioning as the second ply 40.

In FIG. 11a an extremely cost efficient runflat tire is disclosed wherein the tire 10A has only one ply 38 extending from bead core 26 to bead core 26. The ply has a turnup 32 wrapped about each bead core 26 and terminates directly under the belts 36. Interposed between this ply 38 and its turnup end 32 is an insert or elastomeric fillers 46A and 46B and a cord reinforced insert 80. The radially outer insert 46B extends from under the belt structure to the bead core 26. The insert 46B eliminates the bead filler 48 of the other embodiments but preferably employs the cord reinforcing 52,53 previously discussed to provide the necessary lower sidewall stiffness of the lower sidewall and near the bead portion 22.

Figure 11B:
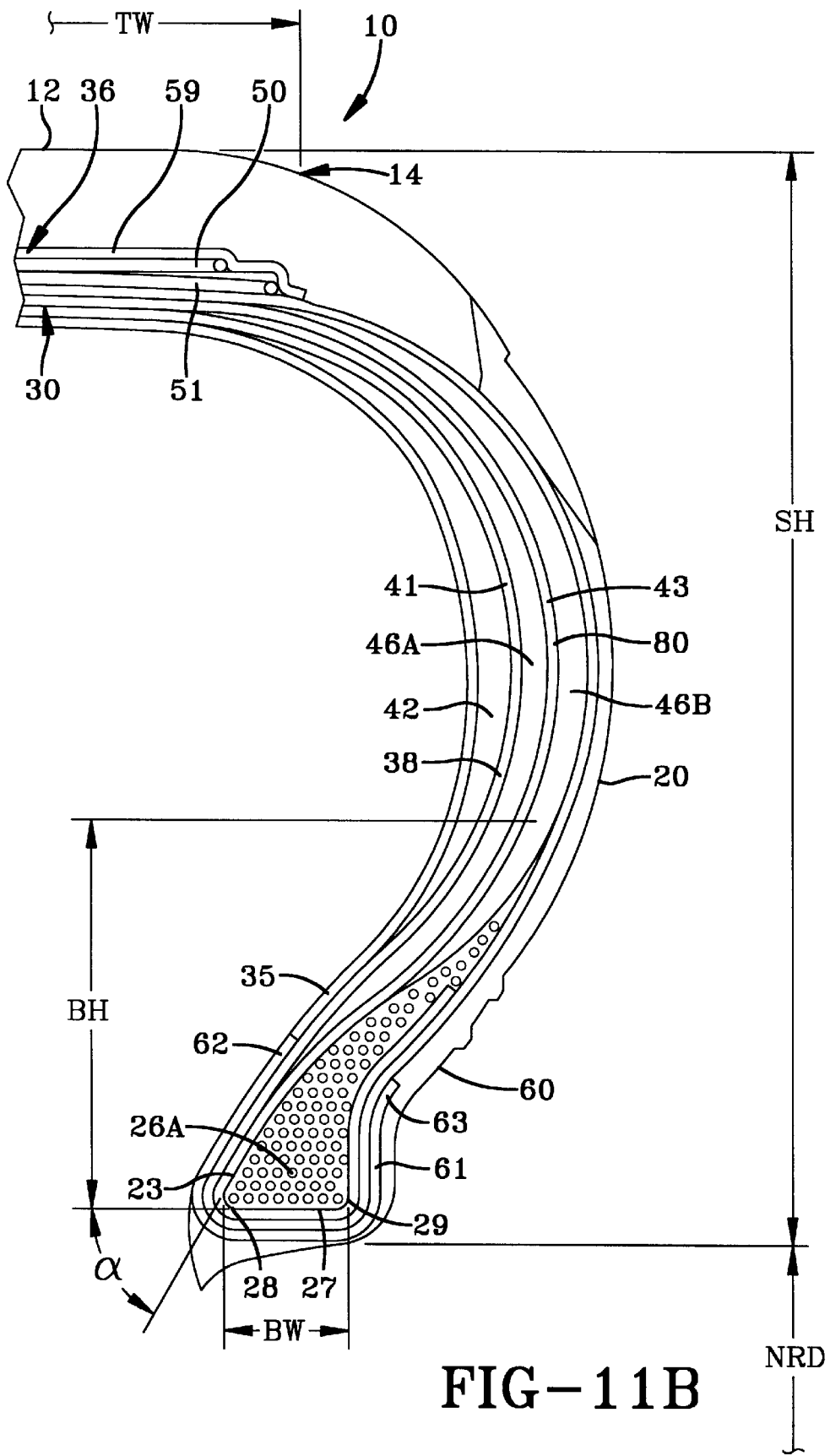
FIG. 11B is similar to the FIG. 11A but with the extended bead core.

Alternatively, the extended bead core 26A of FIG. 7 can be used by eliminating even the use of the cord reinforcements 52,53 as further shown in FIG. 11B. This tire 10A is as described in a co-pending application entitled A LOW COST RUNFLAT TIRE. The use of an insert 80 having cords 41 or 43 used in conjunction with a ply 38 having cords of a relatively higher or lower modulus makes this concept directly compatible with the inventive concepts disclosed. The ply 38 may have the high modulus cords 43 of preferably steel or may have the lower modulus cords 41 of synthetic or textile. Alternatively, the insert 80 can use either cord 41,43 preferably using a cord having a different modulus than the ply 38.

As can be appreciated by the wide variety of tire carcass constructions the designer is given a wide variety of concepts in which he can selectively design this runflat tire. By modifying the tires a range of performance characteristic and cost of manufacture can be achieved making the use of runflat tires commercially viable for the entire spectrum of passenger, light truck and van type vehicles.

The tire 10 of the present invention demonstrates another unique capacity By selecting cords 41 and 43 of differing percent elongations $Y_{41}$, $Y_{43}$, under load the tire carcass can employ two radial plies 38,40 that have the ride and feel of a single ply when normally loaded and inflated, however, when the tire is operated under no inflation the two plies actively support the sidewall structures 20 creating a very good pair of load bearing composite structures.

To better appreciate this feature one of ordinary skill such as a tire engineer must recognize that the radially inner ply 38 has a shorter effective cord length in the sidewall 20 between the belt structure 36 and the bead core 26 or 26A. In the tire of FIG. 2A if ply 38 has a cord 41 that is more extensible than the cord 43 of ply 40 such that the amount of stretch over the cord length is sufficient to enable the other cord 43 to share the load under inflation than the load carrying relationship is dictated by the $L_{41}$, $L_{43}$, the amount of stretch of cord or its percent elongation $Y_{41}$, $Y_{43}$ and the cord spacing (EPI) where $L_{41}$ is the effective cord 41 length and $L_{43}$ is the effective cord 43 length and $\Delta Y_{41}$ and $\Delta Y_{43}$ is the change in cord length of each respective cord under normal load and inflation. When the relationship is such that the length and stretch of the cords 41 is equal to or greater than the outer cords 43 length $L_{41}$ then both plies 38,40 can carry some of the load, by adjusting the stretch factors different proportions or amounts of the load can be established for the plies 38,40. This initial cord length difference is achieved in part by the thickness of the insert 46. Now referring to FIG. 2B when the cord 43 is substantially inextensible then the outer ply cords 41 if extensible will not see much of the cord tension under normal inflation and load. What this means is the tire 10 satisfies the relationship under normal load and inflation that the load is carried by the radially inner ply 38, the radially outer ply 40 only sees dynamic impact loads under severe deflections or when the tire 10 is operated uninflated. The benefit of this concept is that the tire 10's ride and handling is dictated primarily by the ply 38. These relationship are effective even if the cords are made of the same material but are constructed to yield different elongations Y due to the number of filaments and the pitch, turns and warp and wrap of the cord construction, technique of cord construction readily known by those of ordinary skill in the tire art.

As can be seen the tires runflat dynamics are greatly enhanced by employing of differing modulus or of differing percent elongations. The resultant bending axis A will be as shown in FIGS. 3B and 3C wherein the bending axis will be in closer proximity to the ply 38 or 40 with the smaller percent elongation Y for the reasons stated above.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread, a belt structure and a carcass radially inward of the tread and the belt structure, the carcass comprising:
   a pair of inextensible bead cores;
   at least one first ply radially inward of the belt structure and extending from bead core to bead core, the at least one first ply being reinforced by cords having a modulus E;
   a pair of sidewall structures, each extending radially inwardly from the tread, each sidewall structure having at least one first runflat insert radially inward of the at least one first ply, a second runflat insert, and a second ply being spaced from the at least one first ply by the second runflat insert, the second ply being reinforced by cords, the cords having a modulus E different from the cords of the at least one first ply; and wherein the cords of the at least one first ply have a modulus X while the cords of the second ply have a modulus greater than X.

2. The tire of claim 1 wherein the cords of the second ply are substantially inextensible.

3. The tire of claim 2 wherein the cords of the at least one first ply are synthetic.

4. The tire of claim 3 wherein the cords of the at least one ply are selected from the group consisting of nylon, rayon, polyester, and aramid cords.

5. The tire of claim 2 wherein the cords of the second ply are metal.

6. The tire of claim 5 wherein the cords of the second ply are steel.

7. The tire of claim 1 wherein the cords of the second ply are aramid.

8. The tire of claim 1 wherein the second ply is a cord reinforced insert originating just under the belt structure and terminating in proximity to the bead core.

9. The tire of claim 1 wherein the second ply extends from each bead core and is interposed radially below the belt structure and above the at least one first ply.

10. The tire of claim 1 wherein the second runflat insert is elastomeric and reinforced with cords.

11. The tire of claim 1 wherein the second runflat insert is reinforced with short fibers of synthetic material.

12. The tire of claim 1 wherein the tire has a section height SH and the at least one first ply has a pair of turnup ends, one end being wrapped around each bead core and extending radially to a distance of at least 40% of SH.

13. The tire of claim 12 wherein the second ply has a pair of turnup ends, one end being wrapped around each bead core and terminating radially below the turnup ends of the at least one first ply.

14. The tire of claim 1 wherein the at least one first ply has a pair of turnup ends, one end being wrapped around each bead core and extending radially to and laterally under the belt structure.

15. The tire of claim 1 wherein the second runflat insert and the first runflat insert are elastomeric having Shore A hardness in the range of 40 to 90.

16. The tire of claim 15 wherein the Shore A hardness of the first runflat insert is different than the Shore A hardness of the second runflat insert.

17. The tire of claim 1 further comprising a third ply in the carcass.

18. The tire of claim 17 further comprising a third insert in each sidewall.

19. The tire of claim 1 wherein the bead core has a radially outer generally triangular portion slightly cantilevered laterally outwardly and radially extending above the rim flange of a design rim to which the tire is intended to be mounted when the tire is mounted on the rim.

20. The tire of claim 1 wherein each sidewall has a bead filler adjacent the bead core and a cord reinforcement laterally outward and adjacent to the bead filler.

21. The tire of claim 1 wherein the tire when loaded has a neutral axis of bending of the sidewall structure closer in proximity to the second ply relative to the at least one first ply.

22. A tire having a tread, a belt structure and carcass radially inward of the tread and belt structure, the carcass comprising:

at least one first ply reinforced with cords having a modulus E of X, the at least one first ply having a pair of ends wrapped around a pair of inextensible bead cores, the carcass having a pair of sidewall structures extending radially inwardly from the tread, each sidewall structure having at least one first runflat insert radially inward of the at least one first ply, a second ply structure extending to each bead core and spaced from the at least one first ply by a second runflat insert in the sidewall structure, the second ply structure being reinforced with substantially inextensible cords having a modulus greater than X.

23. A tire having a tread, a belt structure and a carcass radially inward of the tread and the belt structure, the carcass comprising:

a pair of inextensible bead cores;

at least one first ply reinforced with cords having a percent elongation of greater than Y, the at least one first ply having a pair of ends extending at least to the bead cores;

a pair of sidewall structures extending radially inwardly from the tread, each sidewall structure having at least one runflat insert radially inward of the at least one first ply, a second runflat insert, and a second ply extending from radially inward of the belt structure to the bead core and being spaced apart from the at least one first ply by the second runflat insert, the second ply being reinforced with cords having a percent elongation Y, and wherein at least one of the plies has a turnup end wrapped around each bead core and extending radially outwardly.

* * * * *